US012563482B2

(12) United States Patent
Zhou et al.

(10) Patent No.: US 12,563,482 B2
(45) **Date of Patent: *Feb. 24, 2026**

(54) PHYSICAL CELL IDENTIFIER LIMIT CONFIGURATION

(71) Applicant: QUALCOMM Incorporated, San Diego, CA (US)

(72) Inventors: Yan Zhou, San Diego, CA (US); Qian Zhang, Basking Ridge, NJ (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/655,050

(22) Filed: May 3, 2024

(65) Prior Publication Data

US 2024/0365215 A1 Oct. 31, 2024

Related U.S. Application Data

(63) Continuation of application No. 17/243,287, filed on Apr. 28, 2021, now Pat. No. 12,004,075.

(Continued)

(51) Int. Cl.
*H04W 48/16* (2009.01)
*H04L 5/00* (2006.01)
(Continued)

(52) U.S. Cl.
CPC ............. *H04W 48/16* (2013.01); *H04L 5/001* (2013.01); *H04W 8/02* (2013.01); *H04W 36/362* (2023.05); *H04W 36/00692* (2023.05)

(58) Field of Classification Search
CPC .............................. H04W 24/02; H04L 5/0007
(Continued)

(56) References Cited

U.S. PATENT DOCUMENTS

| 11,272,412 B2 | 3/2022 | Damnjanovic et al. |
| 2011/0205976 A1 | 8/2011 | Roessel et al. |

(Continued)

OTHER PUBLICATIONS

Apple: "Consecutive Conditiona Handover", 3GPP Draft, 3GPP TSG-RAN WG2 Meeting #107, R2-1909862 Consecutive Conditional Handover_V0, 3rd Generation Partnership Project (3GPP), Mobile Competence Centre, 650, Route Des Lucioles, F-06921, Sophia-Antipolis Cedex, France, vol. RAN WG2, No. Prague, Czech Republic; Aug. 26, 2019-Aug. 30, 2019, Aug. 16, 2019 (Aug. 16, 2019), XP051767653, 4 pages, paragraph [2.2.2].

(Continued)

*Primary Examiner* — Fabricio R Murillo Garcia
(74) *Attorney, Agent, or Firm* — Holland & Hart LLP

(57) ABSTRACT

Methods, systems, and devices for wireless communications are described. A user equipment (UE) may store configurations for candidate physical cell identifiers (PCIs) that the UE may select from for inter-cell mobility. A base station or a UE or both may identify a first configuration indicating a number of configured PCIs for inter-cell mobility operations. The base station or the UE or both may identify a second configuration indicating a number of selected PCIs for inter-cell mobility operations. In some cases, the selected PCIs may be a subset of the configured PCIs. Identifying the number of configured PCIs and the number of selected PCIs by the base station and UE may be based on a capability report configured by the UE. The UE and the base station may perform an inter-cell mobility operation based on stored cell configurations associated with the configured PCIs and the selected PCIs.

20 Claims, 15 Drawing Sheets

Related U.S. Application Data

(60) Provisional application No. 63/018,408, filed on Apr. 30, 2020.

(51) Int. Cl.
    *H04W 8/02*      (2009.01)
    *H04W 36/00*    (2009.01)
    *H04W 36/36*    (2009.01)

(58) Field of Classification Search
    USPC ......................................................... 455/434
    See application file for complete search history.

(56) References Cited

U.S. PATENT DOCUMENTS

| | | | | |
|---|---|---|---|---|
| 2012/0063358 | A1* | 3/2012 | Etemad | H04L 5/003 |
| | | | | 370/254 |
| 2014/0233466 | A1 | 8/2014 | Pourahmadi et al. | |
| 2017/0353913 | A1* | 12/2017 | Sun | H04W 24/02 |
| 2018/0279182 | A1 | 9/2018 | Sang et al. | |
| 2020/0107316 | A1 | 4/2020 | Yamada et al. | |
| 2021/0099924 | A1* | 4/2021 | Shih | H04W 48/10 |
| 2021/0329512 | A1* | 10/2021 | Jassal | H04W 36/0058 |
| 2021/0345232 | A1 | 11/2021 | Zhou | |
| 2022/0167229 | A1* | 5/2022 | Chou | H04W 24/02 |

OTHER PUBLICATIONS

Bannister J., et al., "Universal Mobile Telecommunications System" In: "Convergence Technologies for 3G Networks", Dec. 22, 2003 (Dec. 22, 2003), John Wiley & Sons, Ltd, Chichester. UK, XP055828986, ISBN: 978-0-470-86093-9, pp. 283-286, DOI: 10.1002/0470860936.ch6, Retrieved from the Internet: URL: http://dx.doi.org/10.1002/0470860936.ch6 paragraph [6.7.4.1].

Ericsson: "On L1/L2 Centric Inter-Cell Mobility", 3GPP TSG-RAN WG2#114-e, R2-2105999, 3rd Generation Partnership Project, Mobile Competence Centre, 650, Route Des Lucioles, F- 06921, Sophia-Antipolis Cedex, France, vol. RAN WG2, No. Electronic meeting, May 19, 2021-May 27, 2021, May 10, 2021, 22 pages, XP052004026, paragraph [2.1.2].

Huawei, et al., "Beam-Based NR Mobility Enhancements", 3GPP Draft, 3GPP TSG RAN WG1 Meeting #96bis, R1-1904709, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Apr. 7, 2019 (Apr. 7, 2019), XP051699895, 4 pages, paragraph [82.2].

Huawei, et al., "Signaling Between NG-RAN and 5GC to Support NR Positioning", 3GPP Draft, 3GPP TSG RAN WG1 Meeting #99, R1-1911900, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 9, 2019 (Nov. 9, 2019), XP051823082, 5 pages, paragraph [02.2].

International Preliminary Report on Patentability—PCT/US2021/029851 The International Bureau of WIPO—Geneva, Switzerland, Nov. 10, 2022.

International Search Report and Written Opinion—PCT/US2021/029851—ISA/EPO—Aug. 12, 2021.

Qualcomm Incorporated: "Enhancements on Multi-Beam Operation", 3GPP TSG RAN WG1 Meeting #102-e, R1-2006790, 3rd Generation Partnership Project, Mobile Competence Centre, 650, Route Des Lucioles, F-06921, Sophia-Antipolis Cedex, France, vol. RAN WG1, No. Aug. 17, 2020-Aug. 28, 2020, 7 pages, Aug. 28, 2020, XP051918240, paragraph [0004], p. 6, Proposal 18.

Samsung: "On Rel.17 FeMIMO WI", 3GPP Draft, 3GPP TSG RAN WG1 #101, R1-2003918, 3rd Generation Partnership Project (3GPP), Mobile Competence Centre, 650, Route Des Lucioles, F-06921, Sophia-Antipolis Cedex, France, vol. RAN WG1, No. e-Meeting, May 25, 2020-Jun. 5, 2020, May 15, 2020 (May 15, 2020), XP051885684, 12 pages, paragraph [03.1].

ZTE: "Further Details on Multi-Beam and Multi-TRP Operation," 3GPP Draft, 3GPP TSG RAN WG1 Meeting #104-e, R1-2100292, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2020-Feb. 5, 2020, Jan. 19, 2021 (Jan. 19, 2021), XP051970907, 20 pages, 1 paragraph [06.2]; figure 10.

Bannister J., et al., "Universal Mobile Telecommunications System", Convergence Technologies for 3G Networks, pp. 283-286, Dec. 22, 2003, 160 Pages.

* cited by examiner

215

PCI configurations

210-A     205-A     205-B     210-B

115-A

200

810

815

820

805

800

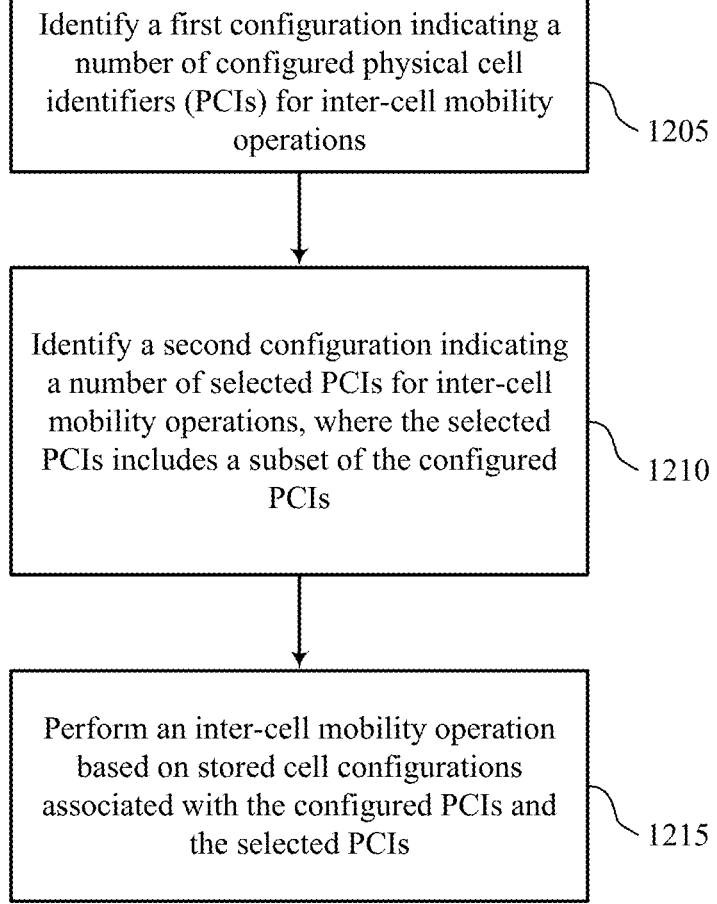

Identify a first configuration indicating a number of configured physical cell identifiers (PCIs) for inter-cell mobility operations

1205

Identify a second configuration indicating a number of selected PCIs for inter-cell mobility operations, where the selected PCIs includes a subset of the configured PCIs

1210

Perform an inter-cell mobility operation based on stored cell configurations associated with the configured PCIs and the selected PCIs

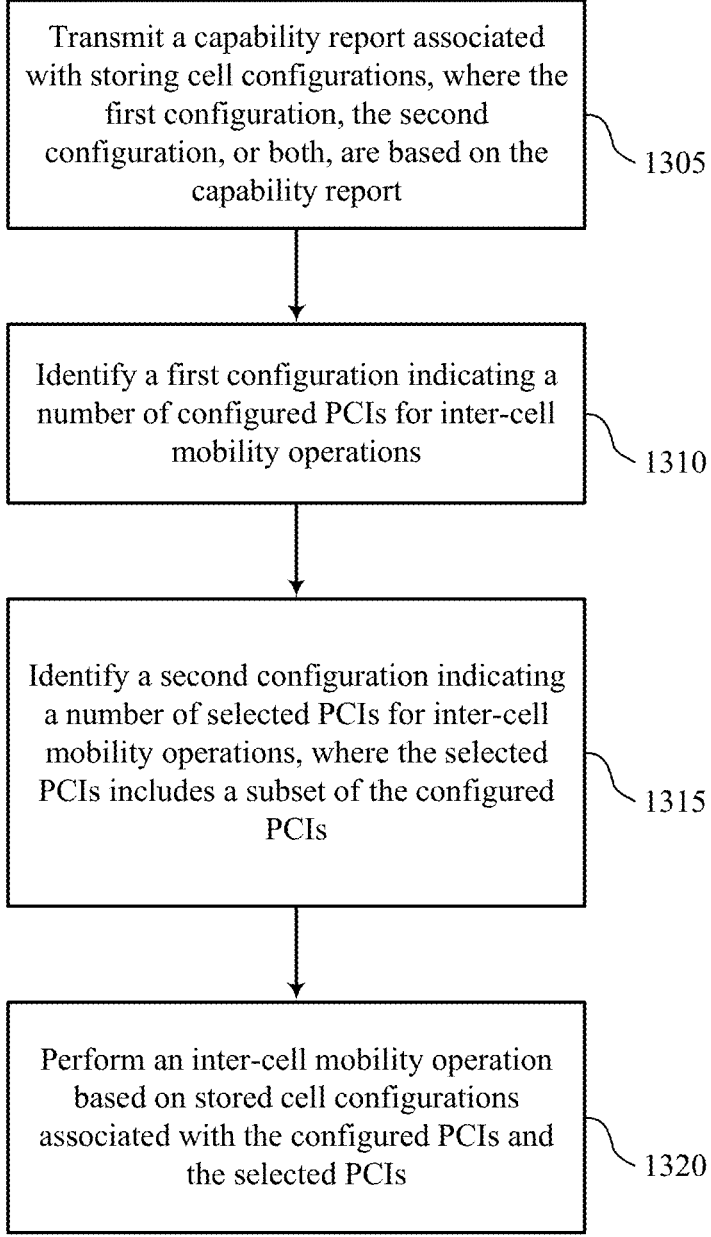

Transmit a capability report associated with storing cell configurations, where the first configuration, the second configuration, or both, are based on the capability report

1305

Identify a first configuration indicating a number of configured PCIs for inter-cell mobility operations

1310

Identify a second configuration indicating a number of selected PCIs for inter-cell mobility operations, where the selected PCIs includes a subset of the configured PCIs

1315

Perform an inter-cell mobility operation based on stored cell configurations associated with the configured PCIs and the selected PCIs

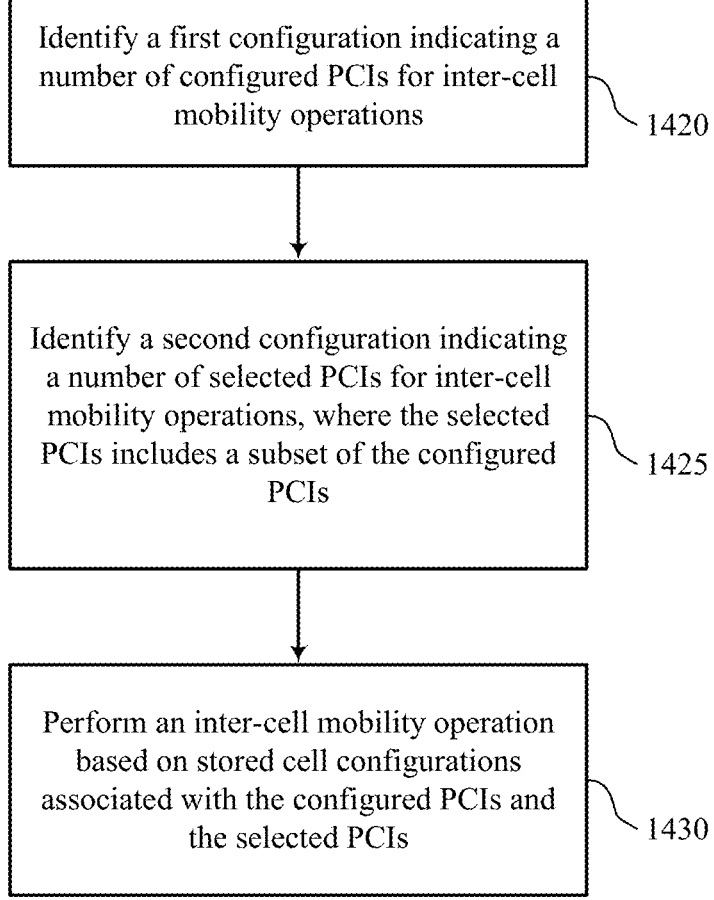

Identify a first configuration indicating a number of configured PCIs for inter-cell mobility operations

1420

Identify a second configuration indicating a number of selected PCIs for inter-cell mobility operations, where the selected PCIs includes a subset of the configured PCIs

1425

Perform an inter-cell mobility operation based on stored cell configurations associated with the configured PCIs and the selected PCIs

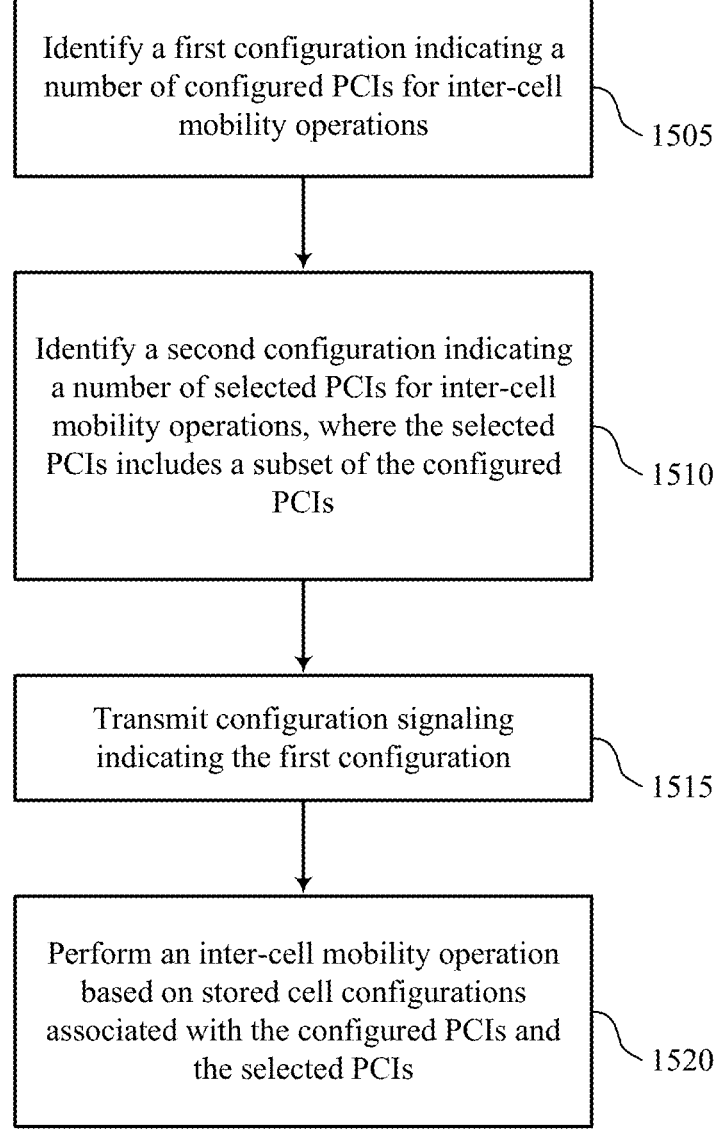

Identify a first configuration indicating a number of configured PCIs for inter-cell mobility operations

1505

Identify a second configuration indicating a number of selected PCIs for inter-cell mobility operations, where the selected PCIs includes a subset of the configured PCIs

1510

Transmit configuration signaling indicating the first configuration

1515

Perform an inter-cell mobility operation based on stored cell configurations associated with the configured PCIs and the selected PCIs

PHYSICAL CELL IDENTIFIER LIMIT CONFIGURATION

CROSS REFERENCE

The present application for patent is a continuation of U.S. Non-Provisional patent application Ser. No. 17/243,287 by ZHOU et al., entitled "PHYSICAL CELL IDENTIFIER LIMIT CONFIGURATION," filed Apr. 28, 2021, which claims the benefit of U.S. Provisional Patent Application No. 63/018,408 by ZHOU et al., entitled "PHYSICAL CELL IDENTIFIER LIMIT CONFIGURATION," filed Apr. 30, 2020, each of which are assigned to the assignee hereof, and expressly incorporated by reference herein in their entirety.

FIELD OF TECHNOLOGY

The following relates generally to wireless communications and more specifically to physical cell identifier (PCI) limit configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be configured with multiple candidate cells to communicate with a wireless communications network. The UE may be configured to communicate with a subset of the candidate cells at a time. Some techniques for configuring and managing the subset of candidate cells based on inter-cell mobility can be improved.

SUMMARY

The described techniques relate to improved methods, systems, devices, and apparatuses that support physical cell identifier (PCI) limit configuration. Generally, the described techniques provide for configuring a user equipment (UE) with a number (e.g., a maximum number) of configured PCIs (e.g., candidate PCIs), or a number (e.g., a maximum number) of selected PCIs, or both. The UE may, in some examples, be served by multiple cells. In some cases, a serving cell may have multiple transmission reception points (TRPs) at different locations, and each TRP may have a different PCI. The UE may be served by a subset of PCIs of a serving cell. In some cases, the UE may be configured with a group of serving cells, in which each serving cell may be associated with a single PCI, and the UE may be served by a selected subset (e.g., one or more) of the group of serving cells. Wireless communications systems described herein may implement techniques for enhanced PCI configuration and selection schemes. For example, a base station or a UE or both may identify a first configuration indicating a number of configured PCIs (e.g., a maximum number of configured PCIs) for inter-cell mobility operations. The base station or the UE or both may identify a second configuration indicating a number of selected PCIs (e.g., a maximum number of selected PCIs) for inter-cell mobility operations. In some cases, the selected PCIs may be a subset of the configured PCIs. In some cases, identifying the number of configured PCIs and the number of selected PCIs by the base station may be based on a capability report transmitted by the UE. In some cases, identifying the number of configured PCIs and the number of selected PCIs by the UE may be based on an indication from the base station. The UE and base station may perform an inter-cell mobility operation based on stored cell configurations associated with the configured PCIs and the selected PCIs.

A method of wireless communications at a UE is described. The method may include identifying a first configuration indicating a number of configured PCIs for inter-cell mobility operations, identifying a second configuration indicating a number of selected PCIs for inter-cell mobility operations, where the selected PCIs includes a subset of the configured PCIs, and performing an inter-cell mobility operation based on stored cell configurations associated with the configured PCIs and the selected PCIs.

An apparatus for wireless communications at a UE is described. The apparatus may include a processor, memory coupled with the processor, and instructions stored in the memory. The instructions may be executable by the processor to cause the apparatus to identify a first configuration indicating a number of configured PCIs for inter-cell mobility operations, identify a second configuration indicating a number of selected PCIs for inter-cell mobility operations, where the selected PCIs includes a subset of the configured PCIs, and perform an inter-cell mobility operation based on stored cell configurations associated with the configured PCIs and the selected PCIs.

Another apparatus for wireless communications at a UE is described. The apparatus may include means for identifying a first configuration indicating a number of configured PCIs for inter-cell mobility operations, identifying a second configuration indicating a number of selected PCIs for inter-cell mobility operations, where the selected PCIs includes a subset of the configured PCIs, and performing an inter-cell mobility operation based on stored cell configurations associated with the configured PCIs and the selected PCIs.

A non-transitory computer-readable medium storing code for wireless communications at a UE is described. The code may include instructions executable by a processor to identify a first configuration indicating a number of configured PCIs for inter-cell mobility operations, identify a second configuration indicating a number of selected PCIs for inter-cell mobility operations, where the selected PCIs includes a subset of the configured PCIs, and perform an inter-cell mobility operation based on stored cell configurations associated with the configured PCIs and the selected PCIs.

A method of wireless communications at a base station is described. The method may include identifying a first configuration indicating a number of configured PCIs for inter-cell mobility operations, identifying a second configuration indicating a number of selected PCIs for inter-cell mobility operations, where the selected PCIs includes a subset of the configured PCIs, and performing an inter-cell mobility operation based on stored cell configurations associated with the configured PCIs and the selected PCIs.

An apparatus for wireless communications at a base station is described. The apparatus may include a processor, memory coupled with the processor, and instructions stored in the memory. The instructions may be executable by the processor to cause the apparatus to identify a first configuration indicating a number of configured PCIs for inter-cell mobility operations, identify a second configuration indicating a number of selected PCIs for inter-cell mobility operations, where the selected PCIs includes a subset of the configured PCIs, and perform an inter-cell mobility operation based on stored cell configurations associated with the configured PCIs and the selected PCIs.

Another apparatus for wireless communications at a base station is described. The apparatus may include means for identifying a first configuration indicating a number of configured PCIs for inter-cell mobility operations, identifying a second configuration indicating a number of selected PCIs for inter-cell mobility operations, where the selected PCIs includes a subset of the configured PCIs, and performing an inter-cell mobility operation based on stored cell configurations associated with the configured PCIs and the selected PCIs.

A non-transitory computer-readable medium storing code for wireless communications at a base station is described. The code may include instructions executable by a processor to identify a first configuration indicating a number of configured PCIs for inter-cell mobility operations, identify a second configuration indicating a number of selected PCIs for inter-cell mobility operations, where the selected PCIs includes a subset of the configured PCIs, and perform an inter-cell mobility operation based on stored cell configurations associated with the configured PCIs and the selected PCIs.

4

Figure 1:
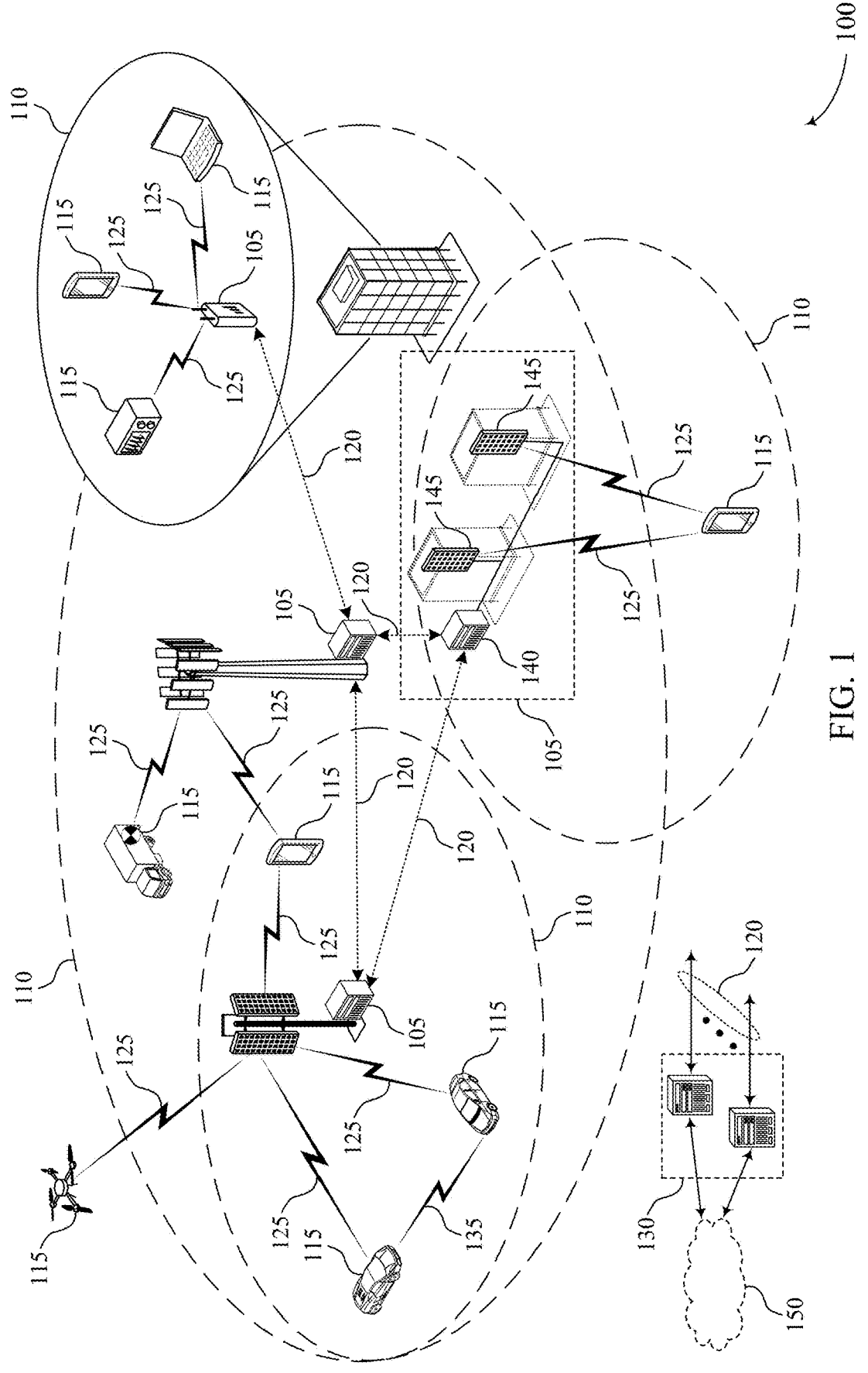
FIG. 1 illustrates an example of a system for wireless communications that supports physical cell identifier (PCI) limit configuration in accordance with aspects of the present disclosure.

FIGS. 12 through 15 show flowcharts illustrating methods that support PCI limit configuration in accordance with aspects of the present disclosure.

DETAILED DESCRIPTION

A user equipment (UE) in a wireless communications system may be served by one or more serving cells. The UE may be handed over or reassigned to serving cells over time as channel conditions change, as the UE moves in the system, etc. This change in serving cells may be referred to as inter-cell mobility, and in some cases, may be referred to as layer 1 (L1)/layer 2 (L2) inter-cell mobility. In some cases, inter-cell mobility may operate based on one of two modes. In a first mode, each serving cell may be associated with multiple transmission reception points (TRPs) where each TRP may be assigned a different physical cell identifier (PCI). In some cases, the TRPs may be located at different locations or the same location. The UE may be served by a subset of PCIs of a serving cell, and the subset of selected PCIs may be changed, for example via downlink control information (DCI) or a medium access control (MAC) control element (CE). In a second mode, the UE may be configured with a group of serving cells with a single PCI per serving cell. The UE may be served by a selected subset of the group of serving cells, which may be changed via DCI or MAC CE.

In some wireless communications systems, a UE may store a configuration for each candidate PCI or serving cell associated with a UE. For example, the UE may store configurations for each PCI in the subset of PCIs the UE is configured with. The configurations may include resources for a synchronization signal block (SSB), random access channel (RACH), control resource set (CORESET), search space, bandwidth part (BWP), etc. The UE may store the configuration such that the selected PCI or serving cell may be used soon after selection. For example, the UE may determine or may receive an indication from a base to switch to a different TRP or serving cell, where the different TRP or serving cell is in the subset of TRPs or serving cells the UE is configured with. The UE may determine and implement the configuration associated with the different TRP or serving cell and communicate with the different TRP or serving cell soon after the determination or indication to switch.

In some cases, storing a large number of configurations may consume a large amount of the UEs memory. To mitigate the amount of memory consumed by PCI configurations, a UE may be configured with a number of PCIs (e.g., a maximum number of PCIs) that UE may select from, where the UE may store some number of PCI configurations up to the number the UE was configured with. Additionally or alternatively, the UE may be configured with a number of PCIs (e.g., a maximum number of PCIs) that may be selected at one time. The configured number of PCIs the UE may select from, or the configured number of PCIs the UE may select at one time, or both may be signaled to the UE, statically configured based on one or more predefined rules, based on the capability of the UE, or some combination of these.

Particular aspects of the subject matter described herein may be implemented to realize one or more advantages. The described techniques may support improvements in storing PCIs configuration by implementing a number of PCIs (e.g., a maximum number of PCIs) the UE may select from and/or a number of PCIs (e.g., a maximum number of PCIs) the UE may connect to at one time to mitigate memory consumption at the UE, among other advantages. As such, supported techniques may include improved network operations and, in some examples, may promote network efficiencies, among other benefits.

Aspects of the disclosure are initially described in the context of wireless communications systems. Aspects are then described with respect to a process flow. Aspects of the disclosure are further illustrated by and described with reference to apparatus diagrams, system diagrams, and flowcharts that relate to PCI limit configuration.

FIG. 1 illustrates an example of a wireless communications system 100 that supports PCI limit configuration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $Ts=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may be configured with a set of candidate PCIs that the UE 115 may select from to perform communications with the network. Each PCI may be associated with a TRP or a serving cell. In some cases, the UE 115 may switch between serving cells (e.g., inter-cell mobility) or TRPs or both based on network conditions, UE 115 mobility through the network, etc. For efficient inter-cell mobility, the UE 115 may store PCI configurations of the configured PCIs. Upon selection of one or more of the candidate PCIs, the UE 115 may identify the stored configuration associated with each selected PCI, and implement the identified configuration. In some wireless communications systems, the UE 115 may be configured with a number (e.g., a maximum number) of configured PCIs (e.g., candidate PCIs), or a number (e.g., a maximum number) of selected PCIs, or both. For example, a base station 105 or a UE 115 or both may identify a first configuration indicating a number of configured PCIs for inter-cell mobility operations. The base station 105 or the UE 115 or both may identify a second configuration indicating a number of selected PCIs for inter-cell mobility operations. In some cases, the selected PCIs may be a subset of the configured PCIs. In some cases, identifying the number of configured PCIs and the number of selected PCIs by the base station 105 and UE 115 may be based on a capability report configured by the UE 115. The UE 115 and base station 105 may perform an inter-cell mobility operation based on stored cell configurations associated with the configured PCIs and the selected PCIs.

Figure 2:
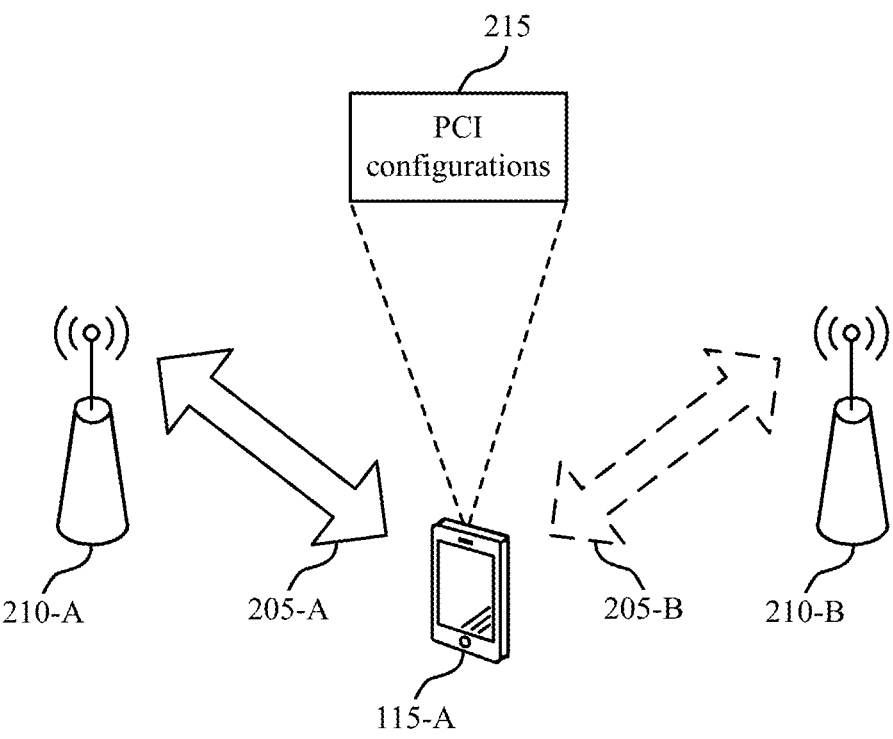
FIG. 2 illustrates an example of a system for wireless communications that supports PCI limit configuration in accordance with aspects of the present disclosure.

FIG. 2 illustrates an example of a wireless communications system 200 that supports PCI limit configuration in accordance with aspects of the present disclosure. In some examples, the wireless communications system 200 may implement aspects of wireless communication system 100. The wireless communications system 200 may include UE 115-*a*, which may be an example of a UE 115 described herein. UE 115-*a* may communicate with one or more TRPs 210, which may be examples of a base station 105 or a serving cell as described herein. In some cases, one or more of the TRPs 210 may determine and configure UE 115-*a* with a number of PCI configurations 215 (e.g., a maximum number of PCI configurations). Additionally or alternatively, other wireless devices, such as UEs 115-*a*, a base station, or some combination of these devices, may determine the number of PCI configurations 215, or the number of PCI configurations 215 may be preconfigured and static.

UE 115-*a* may be configured with one or more cells to communicate with a wireless communications network. UE 115-*a* may receive an indication of a set of PCIs and communicate with the network via one or more cells corresponding to one or more of the PCIs in the set of PCIs. In some cases, the PCIs may be provided by a base station 105 or one or more TRPs 210. For example, a base station 105 may provide one or more cells for UE 115-*a*. Additionally, or alternatively, one or more TRPs 210 may be distributed in the wireless communications system 200 and may provide one or more cells for UE 115-*a*.

The wireless communications system 200 may support enhanced techniques for inter-cell mobility. For example, the wireless communications system 200 may support L1 and L2 based inter-cell mobility. In some examples, L1 may refer to the physical layer, and L2 may refer to the MAC, RLC, and packet data convergence protocol (PDCP) layer.

In some cases, L1 and L2-based inter-cell mobility may include two modes. In a first mode of inter-cell mobility, a serving cell (e.g., each serving cell) may have multiple TRPs 210. In some cases, the TRPs 210 may be at different locations, or be at the same location. In the first mode, each TRP 210 may have a different PCI. The PCI for a TRP 210 in the first mode may be carried by a SSB transmitted by the TRP 210. A UE 115 may be served by a subset of the serving cell's PCIs. In some cases, the subset of serving PCIs may be changed via DCI or MAC CE information.

As an example of the first mode, UE 115-*a* may have one serving cell with multiple TRPs 210, such as TRP 210-*a* and TRP 210-*b*. TRP 210-*a* and TRP 210-*b* may provide the active PCIs for UE 115-*a*, which may be indicated to UE 115-*a* via DCI or a MAC-CE. For example, TRP 210-*a* may be associated with a first PCI and provide link 205-*a* for UE 115-*a*, and TRP 210-*b* may be associated with a second PCI and provide link 205-*b* for UE 115-*a*. In some examples, TRP 210-*a* and TRP 210-*b* may be distributed to different locations within the wireless communications network 200, which may provide improved spatial diversity for UE 115-*a*. TRP 210-*a* and TRP 210-*b* may each transmit an SSB carrying a respective PCI. UE 115-*a* may receive the SSBs and identify the PCIs for TRP 210-*a* and TRP 210-*b*, respectively.

In a second mode, a UE 115 may be configured with a group of serving cells with a single PCI per serving cell. For example, the UE 115 may be configured with multiple serving cells, where each of the serving cells may have a different PCI. Each serving cell may be configured with one or more TRPs 210, where each TRP 210 shares the same PCI as the serving cell the TRP 210 is associated with. The UE 115 may be configured to measure L1 metrics for a serving cell (e.g., per serving cell) in the group. For example, the UE 115 may measure an L1 reference signal received power (RSRP), a signal plus interference to noise ratio (SINR), a reference signal received quality (RSRQ), or other L1 characteristic metrics, for each candidate serving cell. The UE 115 may be served by a subset of the group of serving cells at a time. A base station 105 (e.g., providing the serving cells) or the UE 115 may determine the subset based on an L1 report configured by the UE 115. In some cases, the subset may be changed by DCI or a MAC-CE. For example, the UE 115 may transmit the L1 report for the RSRP, SINR, RSRQ, etc., to a selected serving cell or to an anchor serving cell in the group. The selected serving cell or anchor serving cell may determine the subset or group of serving cells the UE 115 may potentially be served by and transmit an indication of the subset to the UE 115.

As an example of the second mode, TRP 210-*a* may be associated with one or more serving cells for UE 115-*a*. For example, TRP 210-*a* may be associated with a serving cell with a first PCI to provide link 205-*a* for UE 115-*a*. In some cases, TRP 210-*a* may be an example of a base station 105. UE 115-*a* may perform measurements on the one or more serving cells provided by TRP 210-*a* and report the measurements to TRP 210-*a*. TRP 210-*a* may select a subset of the serving cells based on the report and configure the subset as active serving cells (e.g., configured serving cells) for UE 115-*a*. In some other examples, multiple TRPs 210 may provide the serving cells. For example, TRP 210-*a* may provide one or more serving cells, and TRP 210-*b* may provide one or more serving cells. In an example, TRP 210-*b* may provide a second serving cell with a second PCI to provide link 205-*b* for UE 115-*a*.

UE 115-*a* may operate according to mode 1 or mode 2. In either mode, UE 115-*a* may be configured with a set of candidate PCIs (e.g., PCIs associated with TRPs, or PCIs associated with serving cells where each TRP served by the serving cell shares the same PCI) that UE 115-*a* may select for communications with the network at a given time. In some cases, the set of candidate PCIs may be determined based on measurements performed by UE 115-*a* such as layer 3 (L3) measurements, long term, etc., where L3 may refer to a network layer. UE 115-*a* may report the L3 measurements to a network entity that may determine the set of candidate PCIs based on the measurements. UE 115-*a* may select a subset of PCIs from the set of candidate PCIs at a given time based on network conditions, or L1, or L2 measurements, or a combination thereof. For example, UE 115-*a* may be configured with ten candidate PCIs. At a first time, UE 115-*a* may select some number of the ten candidate PCIs. At a second time, UE 115-*a* may select a different subset or a partially different subset of the ten candidate PCIs in relation to the first time. In some cases, UE 115-*a* may store configurations associated with each candidate PCI in the set of candidate PCIs for inter-cell mobility (e.g., L1/L2 inter-cell mobility) such as PCI configurations 215 (e.g., TRP configurations, serving cell configuration, network configurations per candidate PCI). In some cases, the configurations may include resources for synchronization signaling (e.g., SSB signaling), random access signaling (e.g., RACH signaling), control signaling (e.g., CORESET), search space, BWP, etc. such that a selected PCI may be in operation soon after selection.

In some wireless communications systems, the number of PCI configurations 215 UE 115-*a* may store may be limited to conserve memory. In some cases, the number of PCI configurations 215 (e.g., a maximum number of PCI configurations) a UE 115 may store may be statically configured (e.g., based on one or more predefined rules). In some cases, a network entity, such as a base station, TRP 210, access point, etc., may configure (e.g., via control or configuration signaling) a number of PCI configurations 215 that UE 115-*a* may store. In some implementations, the number of PCI configurations 215 UE 115-*a* may store may be based on a capability of UE 115-*a*. For example, UE 115-*a* may determine its capability, such a memory storage capability, and transmit a capability report to the network entity. In some cases, the network entity may be the serving cell UE 115-*a* is currently connected to, or a serving base station, etc. Based on the capability report, the network entity may determine the number of candidate PCI configurations 215 UE 115-*a* may store. The network entity may indicate the number to UE 115-*a*. UE 115-*a* may receive the indication, identify the number of candidate PCIs, and identify a number of PCIs as candidate PCIs up to the number. In some cases, UE 115-*a* may identify a number of PCIs as candidate PCIs that is less than the number. In some cases, the indication from the network entity may include which PCIs are the candidate PCIs.

In some implementations, UE 115-*a* may determine its capability and may be configured to determine a number of PCIs (e.g., a maximum number of PCIs) UE 115-*a* may store as candidates, and indicate the number, or the capability report, or a combination thereof to the network entity. In some cases, the network entity may confirm or deny the number, or indicate the candidate PCIs up to the number determined by UE 115-*a* or by the network entity, or a combination thereof. In some implementations, UE 115-*a* may determine its capability and may be configured to determine a number of PCIs UE 115-*a* may store as candidates, and determine the PCI candidates based on the number. UE 115-*a* may transmit an indication of the number of candidate PCIs to the network entity, or transmit an indication of the candidate PCIs to the network entity, or a combination thereof.

The candidate PCIs, either determined by the network entity or UE 115-*a*, may be determined based at least on network conditions, measurements performed by the network entity, measurements performed by UE 115-*a* (e.g., L3 measurements, long-term measurements), an indication from the network, etc. In some cases, the PCIs in a network may be selected as candidate PCIs based on the PCIs being near UE 115-*a*, or based on the PCIs have a strong connection with UE 115-*a*, or based on the PCIs being available, or a combination thereof.

In some implementations, such as in mode 1, the number of configured PCIs (e.g., a maximum number of configured PCIs) may be per component carrier. For example, a serving cell may support a component carrier. If the serving cell serves multiple TRPs, where each TRP is assigned a different PCI (e.g., mode 1), the PCI configuration metric may be per component carrier. As such, per component carrier, the UE may be configured with up to the number of candidate PCIs. If the number of candidate PCIs is ten, then per component carrier, UE 115-*a* may configure up to ten PCIs, where UE 115-*a* may be configured with up to some number times ten (e.g., n×10) of PCI candidates because the UE 115-*a* may be configured with more than one component carrier.

In some cases, such as in mode 1 with carrier aggregation, a number of component carriers (e.g., a maximum number of component carriers) may be implemented. The number of configured PCIs and the number of component carriers may be under a common limit. In some cases, the number of configured PCIs includes a number of configured PCIs (e.g., a maximum number of configured PCIs) for a group of aggregated component carriers. For example, UE 115-*a* may be configured with a number of candidate PCIs total, regardless of the number of component carriers UE 115-*a* is configured with.

In some cases, the static configuration or signaling from the network entity indicating the number of PCI configurations UE 115-*a* may indicate the inter-cell mobility mode (e.g., mode 1, or mode 2). The static configuration or signaling from the network entity indicating the number of PCI configurations UE 115-*a* may store may indicate what parameter the is in relation to such as per component carrier, across all component carriers, per serving cell, etc.

Additionally or alternatively, the network entity may configure a number of PCIs (e.g., a maximum number of PCIs) UE 115-*a* may select at a time from the candidate PCIs. In some cases, the number of PCIs a UE 115 may select at one time may be statically configured. As described with reference to the number of configured PCIs, the number of selected PCIs may be determined by UE 115-*a*, base station 105-*a*, or a combination thereof. UE 115-*a*, or base station 105-*a*, or both may determine which PCIs of the candidate PCIs UE 115-*a* may use. The PCIs may be selected based on L1 metrics per serving cell or TRP (e.g., L1-RSRP, L1-SINR, L1-RSRQ). In some cases, UE 115-*a* may receive explicit indication from the network entity of the number of PCI candidates, or explicit indication of the number of selected PCIs, or a combination thereof. Additionally or alternatively, UE 115-*a* may receive an explicit indication of one of the metrics and implicitly determine the other metric based on the explicitly indicated metric. For example, UE 115-*a* may be configured with a number of PCIs UE 115-*a* may select, and UE 115-*a* may implicitly determine the number of PCIs UE 115-*a* is configured with, or vice versa. In some cases, UE 115-*a* may receive an explicit configuration indication of which PCIs are candidate PCIs, or an explicit configuration indication of which PCI are the selected PCIs, or both. Additionally or alternatively, UE 115-*a* may receive an explicit configuration indication and implicitly determine the other configuration based on the explicitly indicated configuration.

In some implementations, such as in mode 1, the number of selected PCIs (e.g., the maximum number of selected PCIs) may be per component carrier. For example, a serving cell may support a component carrier. If the serving cell serves multiple TRPs, where each TRP is assigned a different PCI (e.g., mode 1), the PCI selection metric may be per component carrier. As such, per component carrier, the UE 115-*a* may be configured to select up to the number of PCIs. If the number of PCIs for selection is ten, then per component carrier, UE 115-*a* may select up to ten PCIs, where UE 115-*a* may select up to some number times ten (e.g., n×10) of PCIs because the UE 115-*a* may be configured with more than one component carrier.

In some cases, such as in mode 1 with carrier aggregation, a number of component carriers (e.g., a maximum number of component carriers) may be implemented. The number of selected PCIs and the number of component carriers may be under a common limit. In some cases, the number of selected PCIs includes a number of selected PCIs for a group of aggregated component carriers. For example, UE 115-*a* may be configured with a number PCIs the UE 115 may select in total, regardless of the number of component carriers UE 115-*a* is configured with. For example, if UE 115-*a* is configured with multiple component carriers and the number of selected PCIs is ten, UE 115-*a* may select ten PCIs, where the selected PCIs may be across component carriers, or be in the same component carrier as long as the total selected is ten.

In some cases, the static configuration or signaling from the network entity indicating the number of PCIs UE 115-*a* may select may indicate the inter-cell mobility mode (e.g., mode 1, or mode 2). The static configuration or signaling from the network entity indicating the number of PCIs UE 115-*a* may select may indicate what parameter the is in relation to such as per component carrier, across all component carriers, per serving cell, etc.

Figure 3:
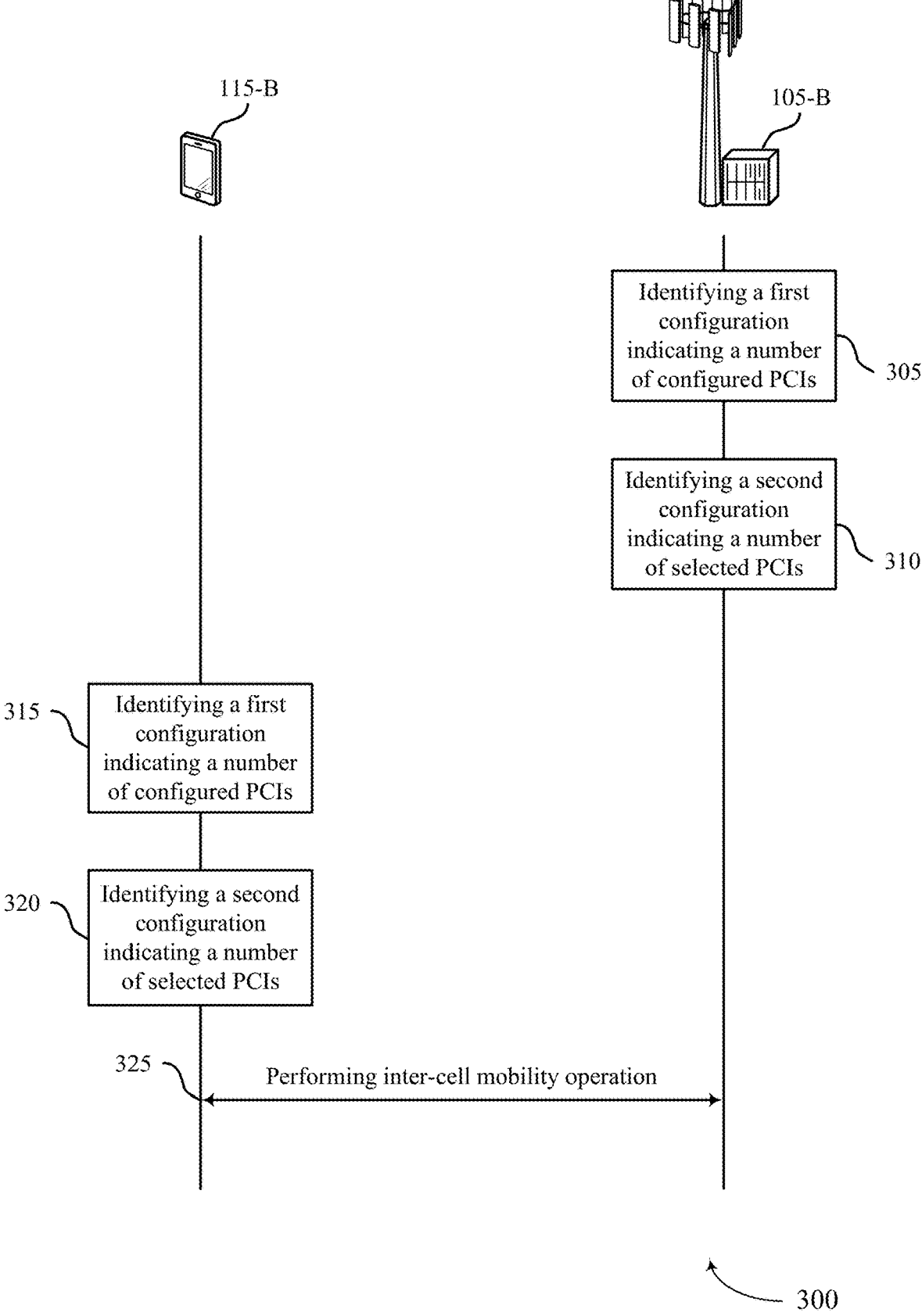
FIG. 3 illustrates an example of a process flow that supports PCI limit configuration in accordance with aspects of the present disclosure.

FIG. 3 illustrates an example of a process flow 300 that supports PCI limit configuration in accordance with aspects of the present disclosure. The process flow 300 may illustrate an example PCI configuration and selecting scheme. For example, base station 105-*b* or UE 115-*b* may identify a number of configured PCIs (e.g., a maximum number of configured PCIs) for UE 115-*a*, or a number of selected PCIs (e.g., a maximum number of selected PCIs) for UE 115-*b*, or both. Base station 105-*b* and UE 115-*b* may be examples of the corresponding wireless devices described with reference to FIGS. 1 and 2. In some cases, another network entity (e.g., another base station, access point, TRP) may identify the number of configured PCIs, the number of selected PCIs, or both. Alternative examples of the following may be implemented, where some steps are performed in a different order than described or are not performed at all. In some cases, steps may include additional features not mentioned below, or further steps may be added.

At 305, base station 105-*b* may identify a first configuration indicating a number of configured PCIs for inter-cell mobility operations. At 310, base station 105-*b* may identify a second configuration indicating a number of selected PCIs for inter-cell mobility operations. In some cases, the selected PCIs may include a subset of the configured PCIs. The number of configured PCIs and the number of selected PCIs may be based on an inter-cell mobility mode configured for UE 115-*a* (e.g., mode 1, or mode 2, or some other mode).

At 315, UE 115-*b* may identify a first configuration indicating a number of configured PCIs (e.g., a maximum number of configured PCIs) for inter-cell mobility operations. The number of configured PCIs may be based on an inter-cell mobility mode configured for UE 115-*a* (e.g., mode 1, or mode 2, or some other mode). The number of configured PCIs for a first inter-cell mobility mode may include a number of configured PCIs per component carrier. The number of configured PCIs for a first inter-cell mobility mode configured with carrier aggregation may include a number of configured PCIs that may be applicable to a group of aggregated component carriers. For example, the number of configured PCIs and the number of component carriers may be under a common limit. The number of configured PCIs for a second inter-cell mobility mode may include a number of configured PCIs in a group of candidate serving cells.

At 320, UE 115-*b* may identify a second configuration indicating a number of selected PCIs (e.g., a maximum number of selected PCIs) for inter-cell mobility operations. The number of selected PCIs may be based on an inter-cell mobility mode configured for UE 115-*a* (e.g., mode 1, or mode 2, or some other mode). In some cases, the selected PCIs includes a subset of the configured PCIs. The number of selected PCIs for a first inter-cell mobility mode may include a number of selected PCIs per component carrier. The number of selected PCIs for a first inter-cell mobility mode configured with carrier aggregation may include a number of selected PCIs that may be applicable to a group of aggregated component carriers. For example, the number of configured PCIs and the number of component carriers may be under a common limit. The number of selected PCIs for a second inter-cell mobility mode may include a number of selected PCIs in a group of candidate serving cells.

In some implementations, the inter-cell mobility mode may include a first inter-cell mobility mode that associates each TRP from a group of TRPs of serving cell with a unique PCI (e.g., mode 1). In some implementations, the inter-cell mobility mode may include a second inter-cell mobility mode that associates each serving cell from a group of configured serving cells with a unique PCI (e.g., mode 2).

Steps 305 through 320 may be performed simultaneously, or a subset of the steps may be performed simultaneously. In some cases, steps 305 and 310 may be based on steps 315 and 320. Additionally or alternatively, steps 315 and 320 may be based on steps 305 and 310. For example, UE 115-*b* may receive configuration signaling indicating the first configuration, the second configuration, or both. In another example, UE 115-*b* may transmit a capability report associated with storing cell configurations, where the first configuration, the second configuration, or both, are based on the capability report. In some cases, the first configuration, the second configuration, or both are statically configured for the UE 115-*b*. The first configuration, or the second configuration, or both may be statically configured for UE 115-*a* based on one or more predefined rules. In some implementations, UE 115-*a* may receive configuration signaling indicating the first configuration. Additionally or alternatively, UE 115-*a* may receive configuration signaling indicating the second configuration.

In some cases, base station 105-*b* or UE 115-*b* may identify a set of configured PCIs based on a first measurement type (e.g., L3 measurement, long-term measurement) having a first measurement periodicity, where the set of configured PCIs may be based on the first configuration (e.g., based on the maximum number PCIs that may be configured). In some implementations, base station 105-*b* or UE 115-*b* may identify a set of selected PCIs based on a second measurement type (e.g., L1 measurement) having a second measurement periodicity that is less than the first measurement periodicity, where the set of selected PCIs may be based on the second configuration (e.g., based on the maximum number of PCIs that may be selected).

At 325, UE 115-*b* and base station 105-*b* may perform an inter-cell mobility operation based on stored cell configurations associated with the configured PCIs and the selected PCIs. In some cases, the inter-cell mobility operations may include L1 or L2 inter-cell mobility operations. For example, UE 115-*a* may switch between serving cells (e.g., inter-cell mobility) or TRPs or both based on network conditions, UE 115-*a* mobility through the network, etc. For efficient inter-cell mobility, the UE 115 may store PCI configurations of the configured PCIs up to the identified number (e.g., the identified maximum number). Upon selection of one or more of the candidate PCIs up to the identified number, the UE 115 may identify the stored configuration associated with each selected PCI, and implement the identified configuration to perform an inter-cell mobility operation. In some cases, the stored cell configurations may include resources for synchronization signaling (e.g., SSB signaling), random access signaling (e.g., RACH signaling), CORESET signaling, search spaces, BWPs, or a combination thereof.

Figure 4:
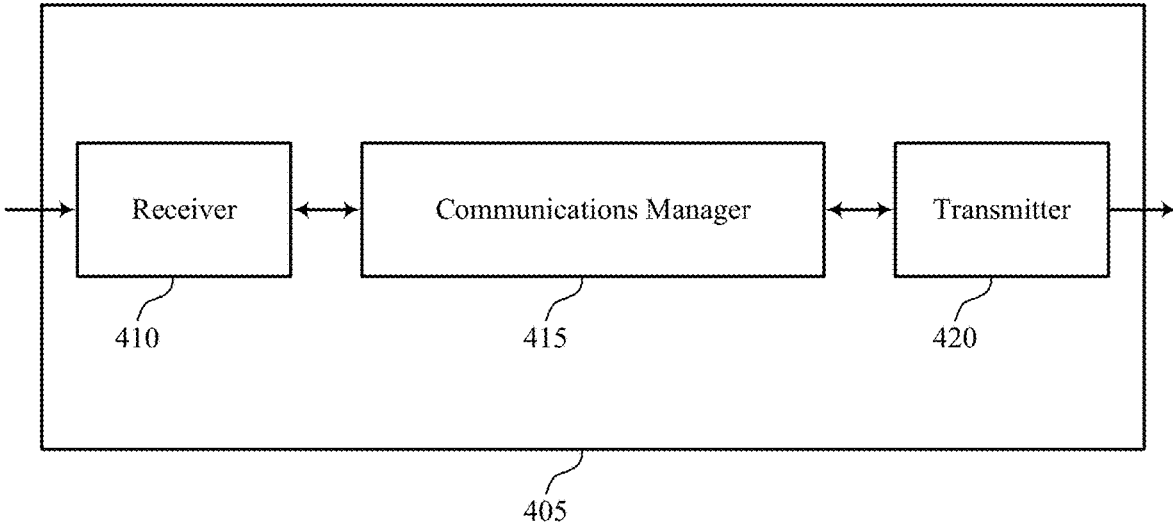
FIGS. 4 and 5 show block diagrams of devices that support PCI limit configuration in accordance with aspects of the present disclosure.

FIG. 4 shows a block diagram 400 of a device 405 that supports PCI limit configuration in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to PCI limit configuration, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify a first configuration indicating a number of configured PCIs for inter-cell mobility operations, identify a second configuration indicating a number of selected PCIs for inter-cell mobility operations, where the selected PCIs includes a subset of the configured PCIs, and perform an inter-cell mobility operation based on stored cell configurations associated with the configured PCIs and the selected PCIs. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver unit (e.g., module). For example, the transmitter 420 may be an example of aspects of the transceiver 720 described with reference to FIG. 7. The transmitter 420 may utilize a single antenna or a set of antennas.

The communications manager 415 as described herein may be implemented to realize one or more potential advantages. One implementation may allow the device 405 to more efficiently perform inter-cell mobility procedures while mitigating the amount of memory used. For example, a device 405 may identify a number of PCI configuration the device 405 may store and identify the number of PCIs the device 405 may select from the configured PCIs to allow the device 405 to implement the PCI configuration quickly after selection.

Based on implementing the PCI configuration and selection schemes as described herein, a processor of a UE 115 (e.g., controlling the receiver 410, the transmitter 420, or the transceiver 720 as described with reference to FIG. 7) may increase efficiency and mitigate memory usage associated with the inter-cell mobility procedures.

Figure 5:
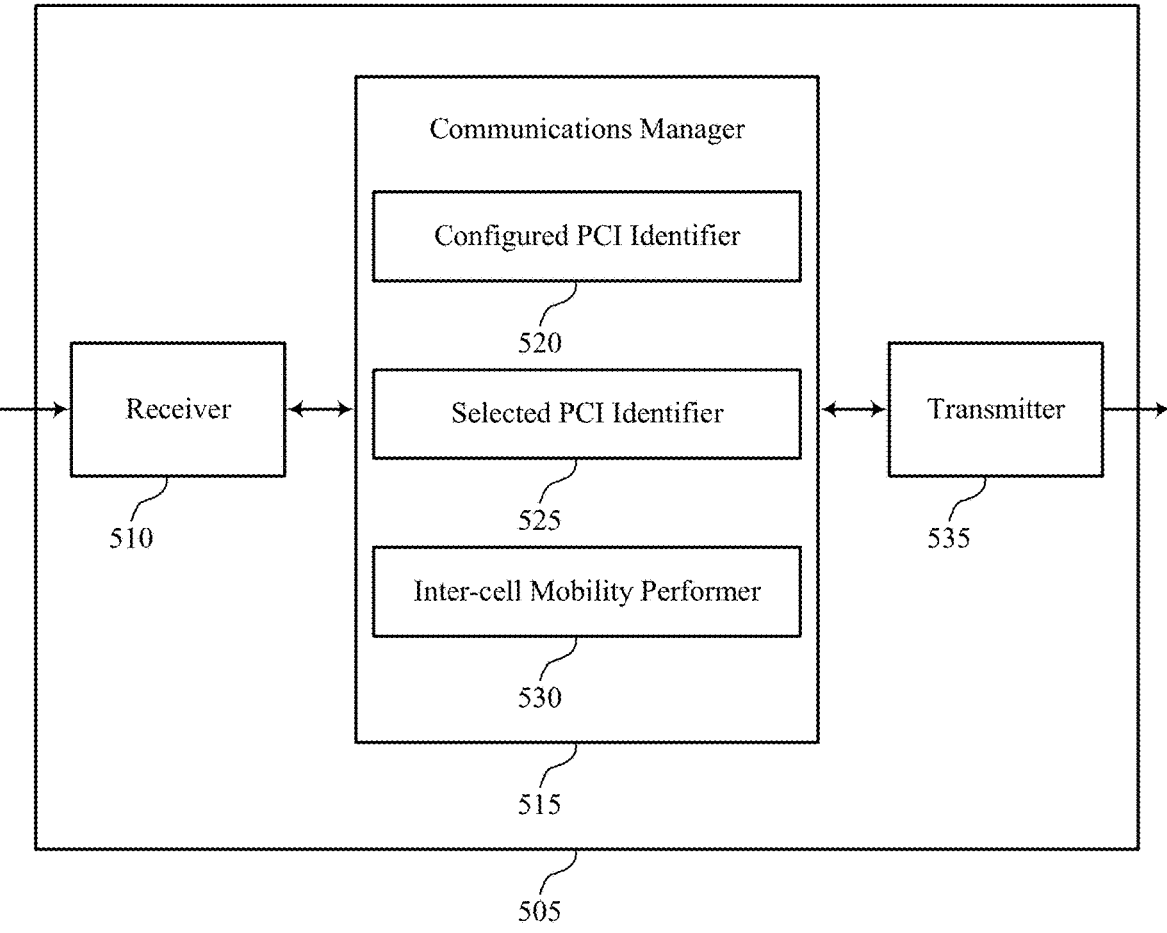

FIG. 5 shows a block diagram 500 of a device 505 that supports PCI limit configuration in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to PCI limit configuration, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a configured PCI identifier 520, a selected PCI identifier 525, and an inter-cell mobility performer 530. The communications manager 515 may be an example of aspects of the communications manager 710 described herein.

The configured PCI identifier 520 may identify a first configuration indicating a number of configured PCIs for inter-cell mobility operations. The selected PCI identifier 525 may identify a second configuration indicating a number of selected PCIs for inter-cell mobility operations, where the selected PCIs includes a subset of the configured PCIs. The inter-cell mobility performer 530 may perform an inter-cell mobility operation based on stored cell configurations associated with the configured PCIs and the selected PCIs.

The transmitter 535 may transmit signals generated by other components of the device 505. In some examples, the transmitter 535 may be collocated with a receiver 510 in a transceiver unit. For example, the transmitter 535 may be an example of aspects of the transceiver 720 described with reference to FIG. 7. The transmitter 535 may utilize a single antenna or a set of antennas.

Figure 6:
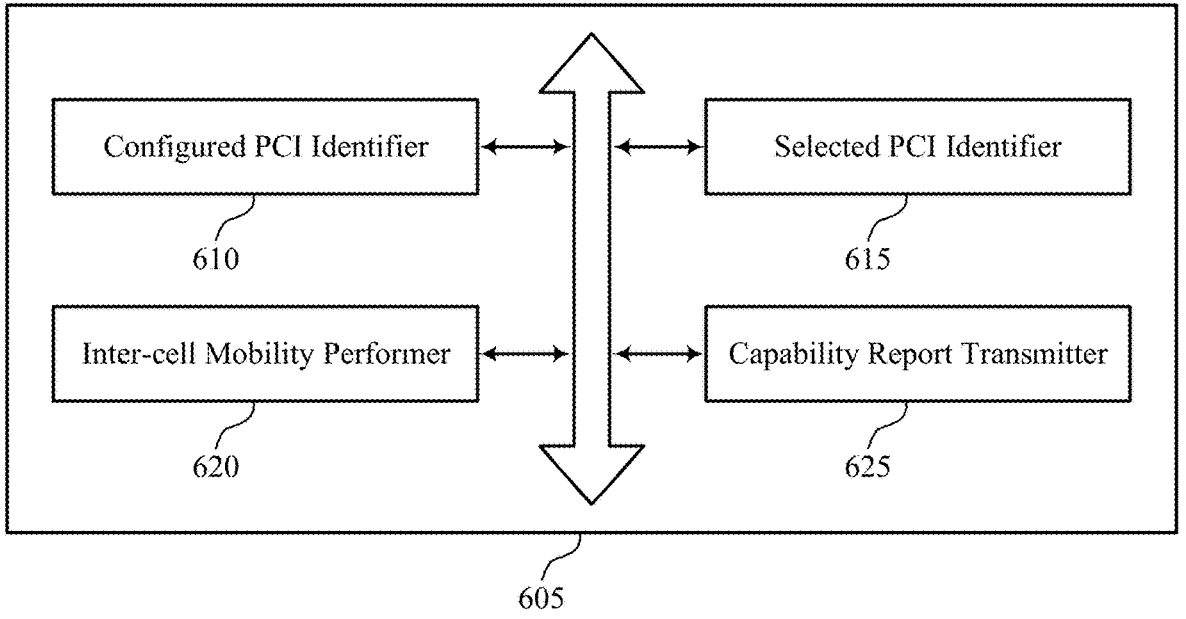
FIG. 6 shows a block diagram of a communications manager that supports PCI limit configuration in accordance with aspects of the present disclosure.
Figure 6:

FIG. 6 shows a block diagram 600 of a communications manager 605 that supports PCI limit configuration in accordance with aspects of the present disclosure. The communications manager 605 may be an example of aspects of a communications manager 415, a communications manager 515, or a communications manager 710 described herein. The communications manager 605 may include a configured PCI identifier 610, a selected PCI identifier 615, an inter-cell mobility performer 620, and a capability report transmitter 625. Each of these units may communicate, directly or indirectly, with one another (e.g., via one or more buses).

The configured PCI identifier 610 may identify a first configuration indicating a number of configured PCIs for inter-cell mobility operations. The selected PCI identifier 615 may identify a second configuration indicating a number of selected PCIs for inter-cell mobility operations, where the selected PCIs includes a subset of the configured PCIs. The inter-cell mobility performer 620 may perform an inter-cell mobility operation based on stored cell configurations associated with the configured PCIs and the selected PCIs.

In some cases, the number of configured PCIs and the number of selected PCIs is based on an inter-cell mobility mode configured for the UE. In some cases, the number of configured PCIs for a first inter-cell mobility mode includes a number of configured PCIs per component carrier. In some cases, the number of configured PCIs for a first inter-cell mobility mode configured with carrier aggregation includes a number of configured PCIs that is applicable to a group of aggregated component carriers. In some cases, the number of configured PCIs for a second inter-cell mobility mode includes a number of configured PCIs in a group of candidate serving cells.

In some cases, the number of selected PCIs for a first inter-cell mobility mode includes a number of selected PCIs per component carrier. In some cases, the number of selected PCIs for a first inter-cell mobility mode configured with carrier aggregation includes a number of selected PCIs that is applicable to a group of aggregated component carriers. In some cases, the number of selected PCIs for a second inter-cell mobility mode includes a number of selected PCIs in a group of candidate serving cells.

In some cases, the inter-cell mobility mode includes a first inter-cell mobility mode that associates each TRP from a group of TRP of serving cell with a unique PCI. In some cases, the inter-cell mobility mode includes a second inter-cell mobility mode that associates each serving cell from a group of configured serving cells with a unique PCI.

In some examples, the configured PCI identifier 610 may receive configuration signaling indicating the first configuration. In some cases, the first configuration is statically configured based on one or more predefined rules.

In some examples, the selected PCI identifier 615 may receive configuration signaling indicating the second configuration. In some cases, the second configuration is statically configured based on one or more predefined rules.

The capability report transmitter 625 may transmit a capability report associated with storing cell configurations, where the first configuration, the second configuration, or both, are based on the capability report.

In some examples, the configured PCI identifier 610 may identify a set of configured PCIs based on a first measurement type having a first measurement periodicity, where the set of configured PCIs is based on the first configuration. In some examples, the selected PCI identifier 615 may identify a set of selected PCIs based on a second measurement type having a second measurement periodicity that is less than the first measurement periodicity, where the set of selected PCIs is based on the second configuration. In some cases, the first measurement type includes a layer three measurement. In some cases, the second measurement type includes a layer one measurement.

In some cases, the stored cell configurations include resources for synchronization signaling, random access signaling, control resource set signaling, search spaces, BWPs, or a combination thereof. In some cases, the inter-cell mobility operations include layer one or layer two inter-cell mobility operations.

Figure 7:
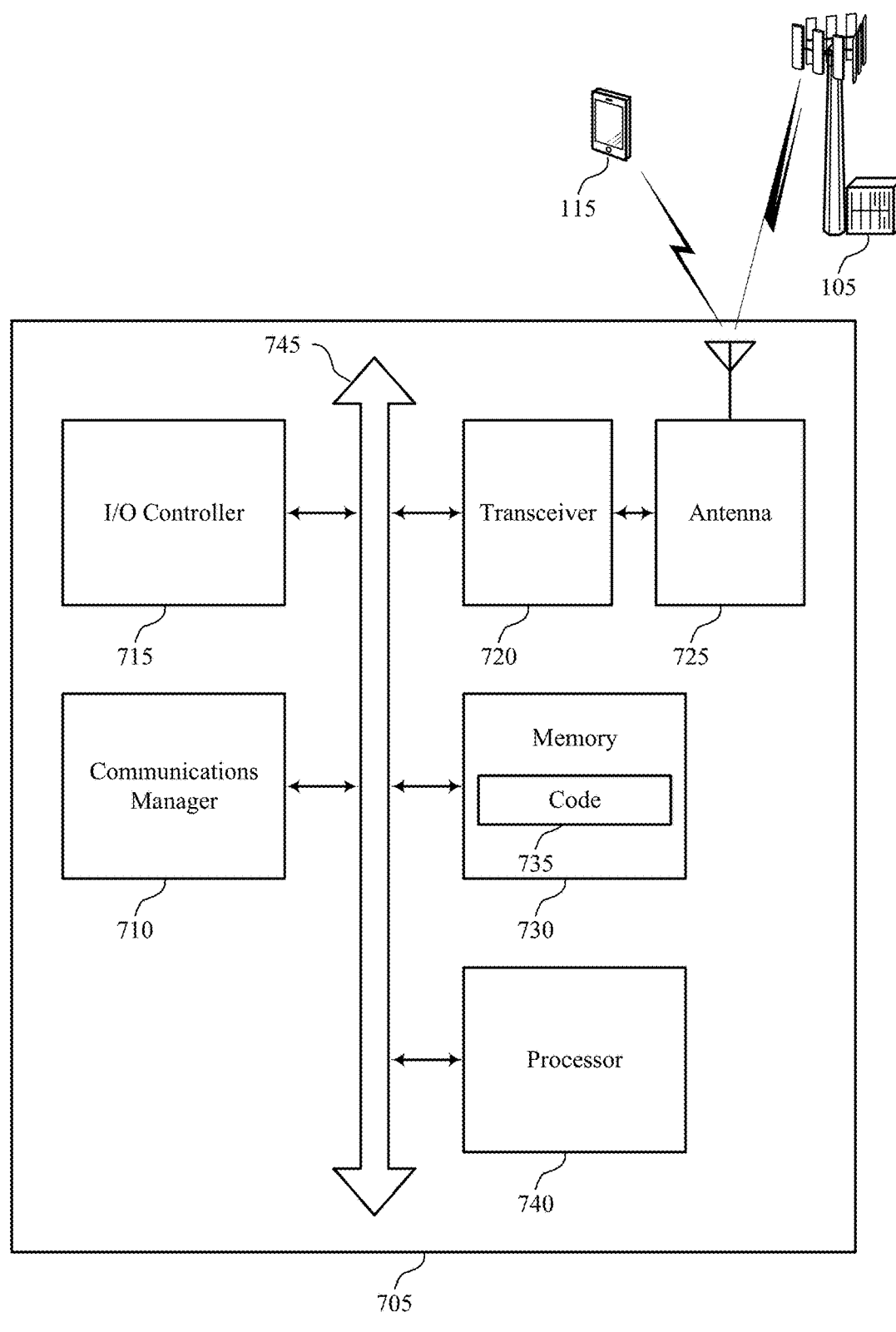
FIG. 7 shows a diagram of a system including a device that supports PCI limit configuration in accordance with aspects of the present disclosure.

FIG. 7 shows a diagram of a system 700 including a device 705 that supports PCI limit configuration in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a first configuration indicating a number of configured PCIs for inter-cell mobility operations, identify a second configuration indicating a number of selected PCIs for inter-cell mobility operations, where the selected PCIs includes a subset of the configured PCIs, and perform an inter-cell mobility operation based on stored cell configurations associated with the configured PCIs and the selected PCIs.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting PCI limit configuration).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
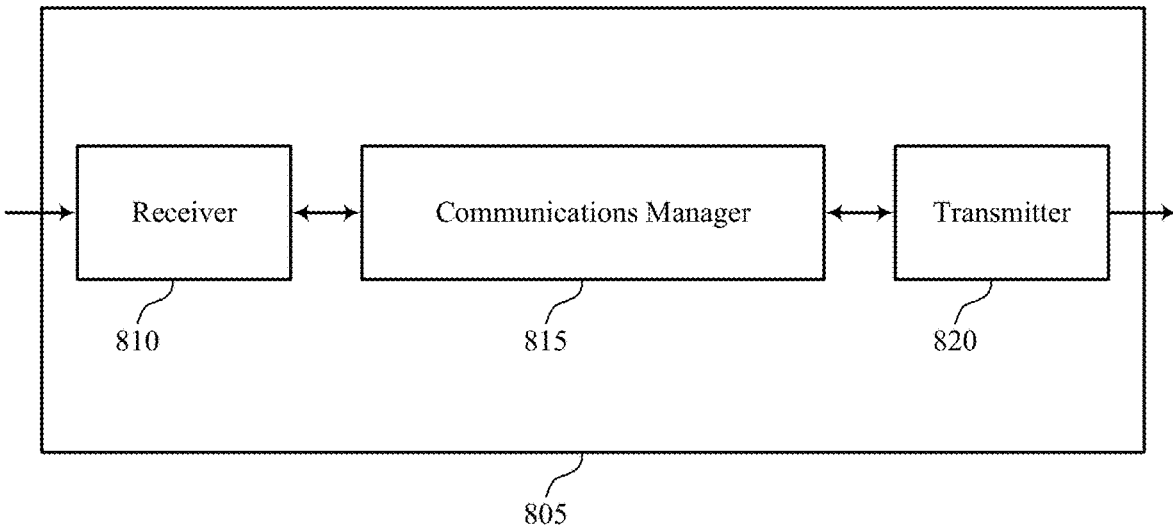
FIGS. 8 and 9 show block diagrams of devices that support PCI limit configuration in accordance with aspects of the present disclosure.

FIG. 8 shows a block diagram 800 of a device 805 that supports PCI limit configuration in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to PCI limit configuration, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a first configuration indicating a number of configured PCIs for inter-cell mobility operations, identify a second configuration indicating a number of selected PCIs for inter-cell mobility operations, where the selected PCIs includes a subset of the configured PCIs, and perform an inter-cell mobility operation based on stored cell configurations associated with the configured PCIs and the selected PCIs. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver unit. For example, the transmitter 820 may be an example of aspects of the transceiver 1120 described with reference to FIG. 11. The transmitter 820 may utilize a single antenna or a set of antennas.

The communications manager 815 as described herein may be implemented to realize one or more potential advantages. One implementation may allow the device 805 to more efficiently perform inter-cell mobility procedures while mitigating the amount of memory used by a UE. For example, a device 505 may identify a number of PCI configuration a UE may store and identify the number of PCIs the UE may select from the configured PCIs to allow the UE to implement the PCI configuration quickly after selection.

Based on implementing the PCI configuration and selection schemes as described herein, a processor of a base station 105 (e.g., controlling the receiver 810, the transmitter 820, or the transceiver 1120 as described with reference to FIG. 11) may increase efficiency and mitigate memory usage of a UE associated with the inter-cell mobility procedures.

Figure 9:
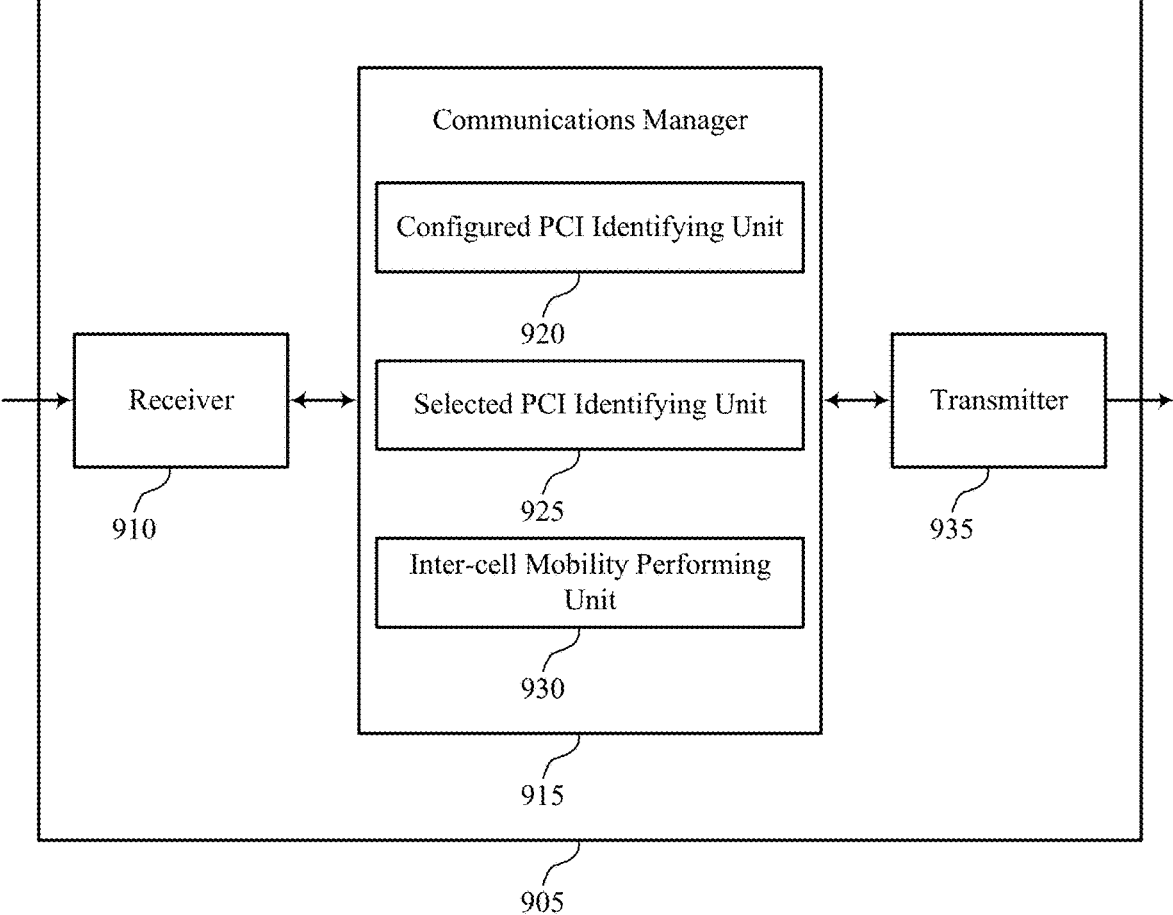

FIG. 9 shows a block diagram 900 of a device 905 that supports PCI limit configuration in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to PCI limit configuration, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configured PCI identifying unit 920, a selected PCI identifying unit 925, and an inter-cell mobility performing unit 930. The communications manager 915 may be an example of aspects of the communications manager 1110 described herein.

The configured PCI identifying unit 920 may identify a first configuration indicating a number of configured PCIs for inter-cell mobility operations. The selected PCI identifying unit 925 may identify a second configuration indicating a number of selected PCIs for inter-cell mobility operations, where the selected PCIs includes a subset of the configured PCIs. The inter-cell mobility performing unit 930 may perform an inter-cell mobility operation based on stored cell configurations associated with the configured PCIs and the selected PCIs.

The transmitter 935 may transmit signals generated by other components of the device 905. In some examples, the transmitter 935 may be collocated with a receiver 910 in a transceiver unit. For example, the transmitter 935 may be an example of aspects of the transceiver 1120 described with reference to FIG. 11. The transmitter 935 may utilize a single antenna or a set of antennas.

Figure 10:
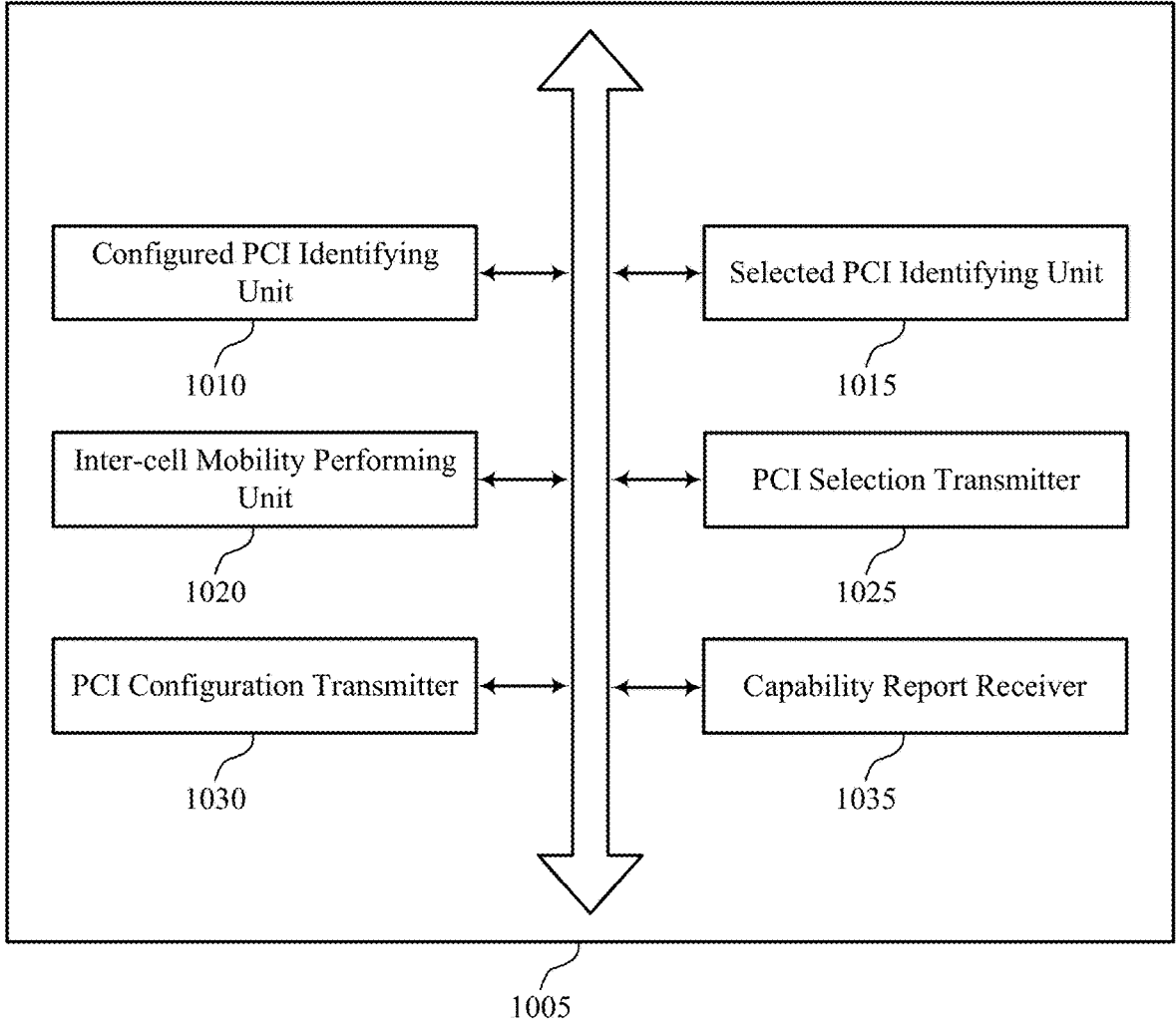
FIG. 10 shows a block diagram of a communications manager that supports PCI limit configuration in accordance with aspects of the present disclosure.

FIG. 10 shows a block diagram 1000 of a communications manager 1005 that supports PCI limit configuration in accordance with aspects of the present disclosure. The communications manager 1005 may be an example of aspects of a communications manager 815, a communications manager 915, or a communications manager 1110 described herein. The communications manager 1005 may include a configured PCI identifying unit 1010, a selected PCI identifying unit 1015, an inter-cell mobility performing unit 1020, a PCI selection transmitter 1025, a PCI configuration transmitter 1030, and a capability report receiver 1035. Each of these units may communicate, directly or indirectly, with one another (e.g., via one or more buses).

The configured PCI identifying unit 1010 may identify a first configuration indicating a number of configured PCIs for inter-cell mobility operations. The selected PCI identifying unit 1015 may identify a second configuration indicating a number of selected PCIs for inter-cell mobility operations, where the selected PCIs includes a subset of the configured PCIs. The inter-cell mobility performing unit 1020 may perform an inter-cell mobility operation based on stored cell configurations associated with the configured PCIs and the selected PCIs.

In some cases, the number of configured PCIs and the number of selected PCIs is based on an inter-cell mobility mode configured for a UE. In some cases, the number of configured PCIs for a first inter-cell mobility mode includes a number of configured PCIs per component carrier. In some cases, the number of configured PCIs for a first inter-cell mobility mode configured with carrier aggregation includes a number of configured PCIs that is applicable to a group of aggregated component carriers. In some cases, the number of configured PCIs for a second inter-cell mobility mode includes a number of configured PCIs in a group of candidate serving cells.

In some cases, the number of selected PCIs for a first inter-cell mobility mode includes a number of selected PCIs per component carrier. In some cases, the number of selected PCIs for a first inter-cell mobility mode configured with carrier aggregation includes a number of selected PCIs that is applicable to a group of aggregated component carriers. In some cases, the number of selected PCIs for a second inter-cell mobility mode includes a number of selected PCIs in a group of candidate serving cells.

In some cases, the inter-cell mobility mode includes a first inter-cell mobility mode that associates each TRP from a group of TRP of serving cell with a unique PCI. In some cases, the inter-cell mobility mode includes a second inter-cell mobility mode that associates each serving cell from a group of configured serving cells with a unique PCI.

The PCI configuration transmitter 1030 may transmit configuration signaling indicating the first configuration. The PCI selection transmitter 1025 may transmit configuration signaling indicating the second configuration. In some cases, the first configuration is statically configured based on one or more predefined rules. In some cases, the second configuration is statically configured based on one or more predefined rules.

The capability report receiver 1035 may receive a capability report associated with storing cell configurations, where the first configuration, the second configuration, or both, are based on the capability report.

In some examples, the configured PCI identifying unit 1010 may identify a set of configured PCIs based on a first measurement type having a first measurement periodicity, where the set of configured PCIs is based on the first configuration. In some examples, the selected PCI identifying unit 1015 may identify a set of selected PCIs based on a second measurement type having a second measurement periodicity that is less than the first measurement periodicity, where the set of selected PCIs is based on the second configuration. In some cases, the first measurement type includes a layer three measurement. In some cases, the second measurement type includes a layer one measurement.

In some cases, the stored cell configurations include resources for synchronization signaling, random access signaling, control resource set signaling, search spaces, BWPs, or a combination thereof. In some cases, the inter-cell mobility operations include layer one or layer two inter-cell mobility operations.

Figure 11:
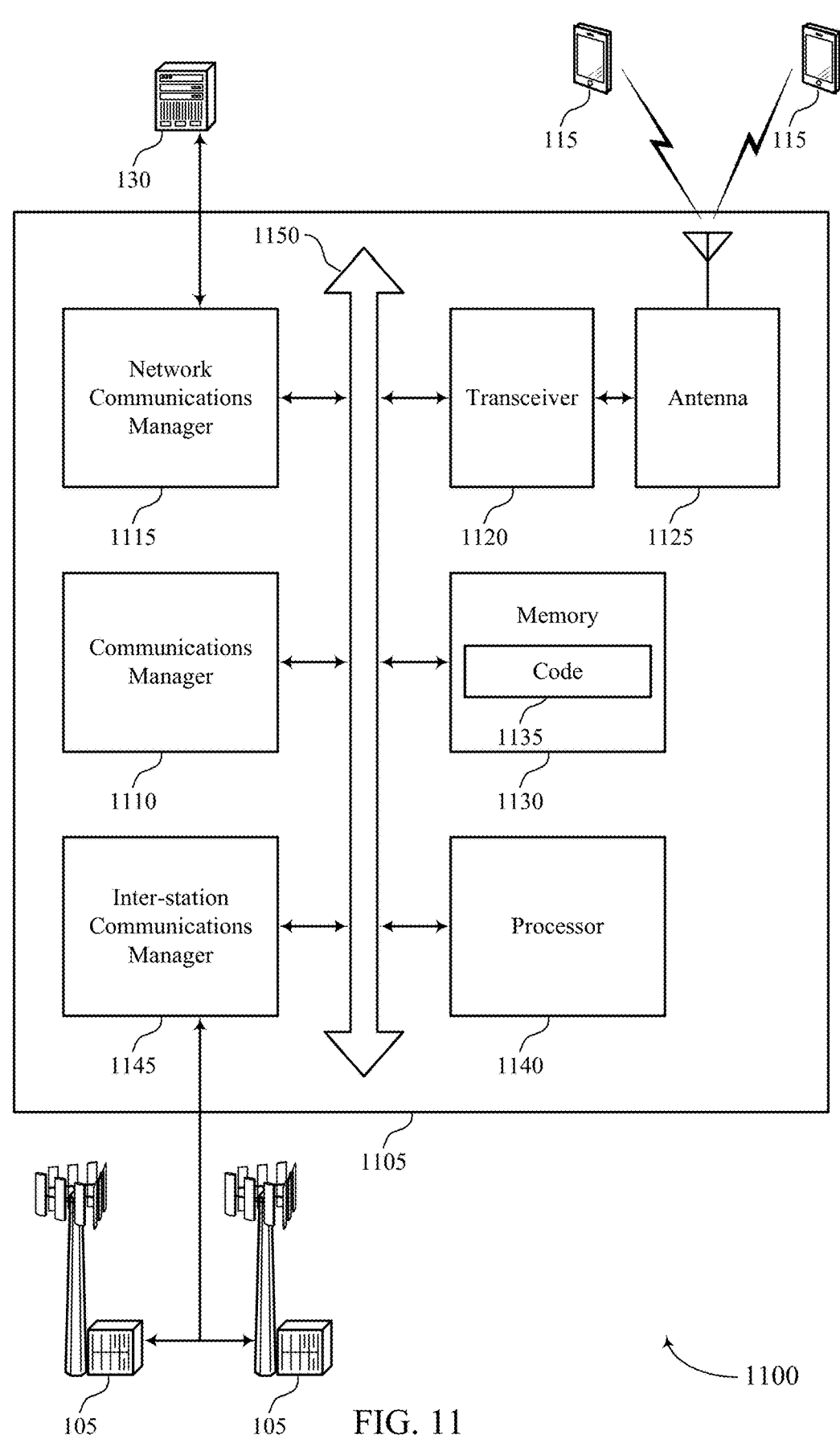
FIG. 11 shows a diagram of a system including a device that supports PCI limit configuration in accordance with aspects of the present disclosure.

FIG. 11 shows a diagram of a system 1100 including a device 1105 that supports PCI limit configuration in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify a first configuration indicating a number of configured PCIs for inter-cell mobility operations, identify a second configuration indicating a number of selected PCIs for inter-cell mobility operations, where the selected PCIs includes a subset of the configured PCIs, and perform an inter-cell mobility operation based on stored cell configurations associated with the configured PCIs and the selected PCIs.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting PCI limit configuration).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

FIG. 12 shows a flowchart illustrating a method 1400 that supports PCI limit configuration in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may identify a first configuration indicating a number of configured PCIs for inter-cell mobility operations. The operations of 1405 may be performed according to the methods described herein. In some examples, aspects of the operations of 1405 may be performed by a configured PCI identifier as described with reference to FIGS. 4 through 7.

At 1410, the UE may identify a second configuration indicating a number of selected PCIs for inter-cell mobility operations, where the selected PCIs includes a subset of the configured PCIs. The operations of 1410 may be performed according to the methods described herein. In some examples, aspects of the operations of 1410 may be performed by a selected PCI identifier as described with reference to FIGS. 4 through 7.

At 1415, the UE may perform an inter-cell mobility operation based on stored cell configurations associated with the configured PCIs and the selected PCIs. The operations of 1415 may be performed according to the methods described herein. In some examples, aspects of the operations of 1415 may be performed by an inter-cell mobility performer as described with reference to FIGS. 4 through 7.

FIG. 13 shows a flowchart illustrating a method 1300 that supports PCI limit configuration in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may transmit a capability report associated with storing cell configurations, where the first configuration, the second configuration, or both, are based on the capability report. The operations of 1305 may be performed according to the methods described herein. In some examples, aspects of the operations of 1305 may be performed by a capability report transmitter as described with reference to FIGS. 4 through 7.

At 1310, the UE may identify a first configuration indicating a number of configured PCIs for inter-cell mobility operations. The operations of 1310 may be performed according to the methods described herein. In some examples, aspects of the operations of 1310 may be performed by a configured PCI identifier as described with reference to FIGS. 4 through 7.

At 1315, the UE may identify a second configuration indicating a number of selected PCIs for inter-cell mobility operations, where the selected PCIs includes a subset of the configured PCIs. The operations of 1315 may be performed according to the methods described herein. In some examples, aspects of the operations of 1315 may be performed by a selected PCI identifier as described with reference to FIGS. 4 through 7.

At 1320, the UE may perform an inter-cell mobility operation based on stored cell configurations associated with the configured PCIs and the selected PCIs. The operations of 1320 may be performed according to the methods described herein. In some examples, aspects of the operations of 1320 may be performed by an inter-cell mobility performer as described with reference to FIGS. 4 through 7.

FIG. 14 shows a flowchart illustrating a method 1400 that supports PCI limit configuration in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1420, the base station may identify a first configuration indicating a number of configured PCIs for inter-cell mobility operations. The operations of 1420 may be performed according to the methods described herein. In some examples, aspects of the operations of 1420 may be performed by a configured PCI identifying unit as described with reference to FIGS. 8 through 11.

At 1425, the base station may identify a second configuration indicating a number of selected PCIs for inter-cell mobility operations, where the selected PCIs includes a subset of the configured PCIs. The operations of 1425 may be performed according to the methods described herein. In some examples, aspects of the operations of 1425 may be performed by a selected PCI identifying unit as described with reference to FIGS. 8 through 11.

At 1430, the base station may perform an inter-cell mobility operation based on stored cell configurations associated with the configured PCIs and the selected PCIs. The operations of 1430 may be performed according to the methods described herein. In some examples, aspects of the operations of 1430 may be performed by an inter-cell mobility performing unit as described with reference to FIGS. 8 through 11.

FIG. 15 shows a flowchart illustrating a method 1500 that supports PCI limit configuration in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may identify a first configuration indicating a number of configured PCIs for inter-cell mobility operations. The operations of 1505 may be performed according to the methods described herein. In some examples, aspects of the operations of 1505 may be performed by a configured PCI identifying unit as described with reference to FIGS. 8 through 11.

At 1510, the base station may identify a second configuration indicating a number of selected PCIs for inter-cell mobility operations, where the selected PCIs includes a subset of the configured PCIs. The operations of 1510 may be performed according to the methods described herein. In some examples, aspects of the operations of 1510 may be performed by a selected PCI identifying unit as described with reference to FIGS. 8 through 11.

At 1515, the base station may transmit configuration signaling indicating the first configuration. The operations of 1515 may be performed according to the methods described herein. In some examples, aspects of the operations of 1515 may be performed by a PCI configuration transmitter as described with reference to FIGS. 8 through 11.

At 1520, the base station may perform an inter-cell mobility operation based on stored cell configurations associated with the configured PCIs and the selected PCIs. The operations of 1520 may be performed according to the methods described herein. In some examples, aspects of the operations of 1520 may be performed by an inter-cell mobility performing unit as described with reference to FIGS. 8 through 11.

The following provides an overview of aspects of the present disclosure:

Aspect 1: A method for wireless communications at a UE, comprising: identifying a first configuration indicating a number of configured physical cell identifiers for inter-cell mobility operations; identifying a second configuration indicating a number of selected physical cell identifiers for inter-cell mobility operations, wherein the selected physical cell identifiers comprises a subset of the configured physical cell identifiers; and performing an inter-cell mobility operation based at least in part on stored cell configurations associated with the configured physical cell identifiers and the selected physical cell identifiers.

Aspect 2: The method of aspect 1, wherein the number of configured physical cell identifiers and the number of selected physical cell identifiers is based at least in part on an inter-cell mobility mode configured for the UE.

Aspect 3: The method of aspect 2, wherein the number of configured physical cell identifiers for a first inter-cell mobility mode comprises a number of configured physical cell identifiers per component carrier.

Aspect 4: The method of any of aspects 2 through 3, wherein the number of configured physical cell identifiers for a first inter-cell mobility mode configured with carrier aggregation comprises a number of configured physical cell identifiers that is applicable to a group of aggregated component carriers.

Aspect 5: The method of any of aspects 2 through 4, wherein the number of configured physical cell identifiers for a second inter-cell mobility mode comprises a number of configured physical cell identifiers in a group of candidate serving cells.

Aspect 6: The method of any of aspects 2 through 5, wherein the number of selected physical cell identifiers for a first inter-cell mobility mode comprises a number of selected physical cell identifiers per component carrier.

Aspect 7: The method of any of aspects 2 through 6, wherein the number of selected physical cell identifiers for a first inter-cell mobility mode configured with carrier aggregation comprises a number of selected physical cell identifiers that is applicable to a group of aggregated component carriers.

Aspect 8: The method of any of aspects 2 through 7, wherein the number of selected physical cell identifiers for a second inter-cell mobility mode comprises a number of selected physical cell identifiers in a group of candidate serving cells.

Aspect 9: The method of any of aspects 2 through 8, wherein the inter-cell mobility mode comprises a first inter-cell mobility mode that associates each transmission reception point from a group of transmission reception points of serving cell with a unique physical cell identifier.

Aspect 10: The method of any of aspects 2 through 9, wherein the inter-cell mobility mode comprises a second inter-cell mobility mode that associates each serving cell from a group of configured serving cells with a unique physical cell identifier.

Aspect 11: The method of any of aspects 1 through 10, wherein identifying the first configuration comprises: receiving configuration signaling indicating the first configuration.

Aspect 12: The method of any of aspects 1 through 11, wherein identifying the second configuration comprises: receiving configuration signaling indicating the second configuration.

Aspect 13: The method of any of aspects 1 through 12, wherein the first configuration is statically configured based at least in part on one or more predefined rules.

Aspect 14: The method of any of aspects 1 through 13, wherein the second configuration is statically configured based at least in part on one or more predefined rules.

Aspect 15: The method of any of aspects 1 through 14, further comprising: transmitting a capability report associated with storing cell configurations, wherein the first configuration, the second configuration, or both, are based at least in part on the capability report.

Aspect 16: The method of any of aspects 1 through 15, further comprising: identifying a set of configured physical cell identifiers based at least in part on a first measurement type having a first measurement periodicity, wherein the set of configured physical cell identifiers is based at least in part on the first configuration.

Aspect 17: The method of aspect 16, further comprising: identifying a set of selected physical cell identifiers based at least in part on a second measurement type having a second measurement periodicity that is less than the first measurement periodicity, wherein the set of selected physical cell identifiers is based at least in part on the second configuration.

Aspect 18: The method of aspect 17, wherein the first measurement type comprises a layer three measurement; and the second measurement type comprises a layer one measurement.

Aspect 19: The method of any of aspects 1 through 18, wherein the stored cell configurations comprise resources for synchronization signaling, random access signaling, control resource set signaling, search spaces, bandwidth parts, or a combination thereof.

Aspect 20: The method of any of aspects 1 through 19, wherein the inter-cell mobility operations comprise layer one or layer two inter-cell mobility operations.

Aspect 21: A method for wireless communications at a base station, comprising: identifying a first configuration indicating a number of configured physical cell identifiers for inter-cell mobility operations; identifying a second configuration indicating a number of selected physical cell identifiers for inter-cell mobility operations, wherein the selected physical cell identifiers comprises a subset of the configured physical cell identifiers; and performing an inter-cell mobility operation based at least in part on stored cell configurations associated with the configured physical cell identifiers and the selected physical cell identifiers.

Aspect 22: The method of aspect 21, wherein the number of configured physical cell identifiers and the number of selected physical cell identifiers is based at least in part on an inter-cell mobility mode configured for a UE.

Aspect 23: The method of aspect 22, wherein the number of configured physical cell identifiers for a first inter-cell mobility mode comprises a number of configured physical cell identifiers per component carrier.

Aspect 24: The method of any of aspects 22 through 23, wherein the number of configured physical cell identifiers for a first inter-cell mobility mode configured with carrier aggregation comprises a number of configured physical cell identifiers that is applicable to a group of aggregated component carriers.

Aspect 25: The method of any of aspects 22 through 24, wherein the number of configured physical cell identifiers for a second inter-cell mobility mode comprises a number of configured physical cell identifiers in a group of candidate serving cells.

Aspect 26: The method of any of aspects 22 through 25, wherein the number of selected physical cell identifiers for a first inter-cell mobility mode comprises a number of selected physical cell identifiers per component carrier.

Aspect 27: The method of any of aspects 22 through 26, wherein the number of selected physical cell identifiers for a first inter-cell mobility mode configured with carrier aggregation comprises a number of selected physical cell identifiers that is applicable to a group of aggregated component carriers.

Aspect 28: The method of any of aspects 22 through 27, wherein the number of selected physical cell identifiers for a second inter-cell mobility mode comprises a number of selected physical cell identifiers in a group of candidate serving cells.

Aspect 29: The method of any of aspects 22 through 28, wherein the inter-cell mobility mode comprises a first inter-cell mobility mode that associates each transmission reception point from a group of transmission reception points of serving cell with a unique physical cell identifier.

Aspect 30: The method of any of aspects 22 through 29, wherein the inter-cell mobility mode comprises a second inter-cell mobility mode that associates each serving cell from a group of configured serving cells with a unique physical cell identifier.

Aspect 31: The method of any of aspects 21 through 30, further comprising: transmitting configuration signaling indicating the first configuration.

Aspect 32: The method of any of aspects 21 through 31, further comprising: transmitting configuration signaling indicating the second configuration.

Aspect 33: The method of any of aspects 21 through 32, wherein the first configuration is statically configured based at least in part on one or more predefined rules.

Aspect 34: The method of any of aspects 21 through 33, wherein the second configuration is statically configured based at least in part on one or more predefined rules.

Aspect 35: The method of any of aspects 21 through 34, further comprising: receiving a capability report associated with storing cell configurations, wherein the first configuration, the second configuration, or both, are based at least in part on the capability report.

Aspect 36: The method of any of aspects 21 through 35, further comprising: identifying a set of configured physical cell identifiers based at least in part on a first measurement type having a first measurement periodicity, wherein the set of configured physical cell identifiers is based at least in part on the first configuration.

Aspect 37: The method of aspect 36, further comprising: identifying a set of selected physical cell identifiers based at least in part on a second measurement type having a second measurement periodicity that is less than the first measurement periodicity, wherein the set of selected physical cell identifiers is based at least in part on the second configuration.

Aspect 38: The method of aspect 37, wherein the first measurement type comprises a layer three measurement; and the second measurement type comprises a layer one measurement.

Aspect 39: The method of any of aspects 21 through 38, wherein the stored cell configurations comprise resources for synchronization signaling, random access signaling, control resource set signaling, search spaces, bandwidth parts, or a combination thereof.

Aspect 40: The method of any of aspects 21 through 39, wherein the inter-cell mobility operations comprise layer one or layer two inter-cell mobility operations.

Aspect 41: An apparatus for wireless communications at a UE, comprising a processor; memory coupled with the processor; and instructions stored in the memory and executable by the processor to cause the apparatus to perform a method of any of aspects 1 through 20.

Aspect 42: An apparatus for wireless communications at a UE, comprising at least one means for performing a method of any of aspects 1 through 20.

Aspect 43: A non-transitory computer-readable medium storing code for wireless communications at a UE, the code comprising instructions executable by a processor to perform a method of any of aspects 1 through 20.

Aspect 44: An apparatus for wireless communications at a base station, comprising a processor; memory coupled with the processor; and instructions stored in the memory and executable by the processor to cause the apparatus to perform a method of any of aspects 21 through 40.

Aspect 45: An apparatus for wireless communications at a base station, comprising at least one means for performing a method of any of aspects 21 through 40.

Aspect 46: A non-transitory computer-readable medium storing code for wireless communications at a base station, the code comprising instructions executable by a processor to perform a method of any of aspects 21 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors and storing instructions executable by the one or more processors to cause the UE to:
   receive a first configuration including a maximum number of configured physical cell identifiers for inter-cell mobility operations;
   receive a second configuration indicating a selected physical cell identifier for the inter-cell mobility operations, wherein the selected physical cell identifier is selected from the configured physical cell identifiers; and
   perform an inter-cell mobility operation based at least in part on the selected physical cell identifier from the configured physical cell identifiers.

2. The apparatus of claim 1, wherein the maximum number of configured physical cell identifiers and the selected physical cell identifier are based at least in part on an inter-cell mobility mode configured for the UE.

3. The apparatus of claim 2, wherein the maximum number of configured physical cell identifiers for a first inter-cell mobility mode comprises a maximum number of configured physical cell identifiers per component carrier.

4. The apparatus of claim 2, wherein the maximum number of configured physical cell identifiers for a first inter-cell mobility mode configured with carrier aggregation comprises a maximum number of configured physical cell identifiers that is applicable to a group of aggregated component carriers.

5. The apparatus of claim 2, wherein the maximum number of configured physical cell identifiers for a second inter-cell mobility mode comprises a maximum number of configured physical cell identifiers in a group of candidate serving cells.

6. The apparatus of claim 2, wherein the selected physical cell identifier for a first inter-cell mobility mode is associated with a component carrier.

7. The apparatus of claim 2, wherein the selected physical cell identifier for a first inter-cell mobility mode configured with carrier aggregation comprises a selected physical cell identifier that is applicable to a group of aggregated component carriers.

8. The apparatus of claim 2, wherein the selected physical cell identifier for a second inter-cell mobility mode comprises a selected physical cell identifier in a group of candidate serving cells.

9. The apparatus of claim 2, wherein the inter-cell mobility mode comprises a first inter-cell mobility mode that associates each transmission reception point from a group of transmission reception points of serving cell with a unique physical cell identifier.

10. The apparatus of claim 2, wherein the inter-cell mobility mode comprises a second inter-cell mobility mode that associates each serving cell from a group of configured serving cells with a unique physical cell identifier.

11. The apparatus of claim 1, wherein the instructions are further executable by the one or more processors to cause the UE to:

transmit a capability report associated with storing cell configurations, wherein the first configuration, the second configuration, or both, are based at least in part on the capability report.

12. The apparatus of claim 1, wherein the instructions are further executable by the one or more processors to cause the UE to:

identify a set of configured physical cell identifiers based at least in part on a first measurement type having a first measurement periodicity, wherein the set of configured physical cell identifiers is based at least in part on the first configuration.

13. The apparatus of claim 12, wherein the instructions are further executable by the one or more processors to cause the UE to:

identify a set of selected physical cell identifiers based at least in part on a second measurement type having a second measurement periodicity that is less than the first measurement periodicity, wherein the set of selected physical cell identifiers is based at least in part on the second configuration.

14. The apparatus of claim 13, wherein:

the first measurement type comprises a layer three measurement; and the second measurement type comprises a layer one measurement.

15. An apparatus for wireless communications at a base station, comprising:

one or more processors;

one or more memories coupled with the one or more processors and storing instructions executable by the one or more processors to cause the base station to:

transmit a first configuration including a maximum number of configured physical cell identifiers for inter-cell mobility operations;

transmit a second configuration indicating a selected physical cell identifier for the inter-cell mobility operations, wherein the selected physical cell identifier is selected from the configured physical cell identifiers; and perform an inter-cell mobility operation based at least in part on the selected physical cell identifier from the configured physical cell identifiers.

16. The apparatus of claim 15, wherein the maximum number of configured physical cell identifiers and the selected physical cell identifier is based at least in part on an inter-cell mobility mode configured for a user equipment (UE).

17. The apparatus of claim 16, wherein the maximum number of configured physical cell identifiers for a first inter-cell mobility mode comprises a maximum number of configured physical cell identifiers per component carrier.

18. The apparatus of claim 16, wherein the maximum number of configured physical cell identifiers for a first inter-cell mobility mode configured with carrier aggregation comprises a maximum number of configured physical cell identifiers that is applicable to a group of aggregated component carriers.

19. The apparatus of claim 16, wherein the maximum number of configured physical cell identifiers for a second inter-cell mobility mode comprises a maximum number of configured physical cell identifiers in a group of candidate serving cells.

20. A method for wireless communications at a user equipment (UE), comprising:

receiving a first configuration including a maximum number of configured physical cell identifiers for inter-cell mobility operations;

receiving a second configuration indicating a selected physical cell identifier for the inter-cell mobility operations, wherein the selected physical cell identifier is selected from the configured physical cell identifiers; and performing an inter-cell mobility operation based at least in part on the selected physical cell identifier from the configured physical cell identifiers.

* * * * *